(12) United States Patent
Kai

(10) Patent No.: US 8,538,259 B2
(45) Date of Patent: Sep. 17, 2013

(54) OPTICAL ACCESS NETWORK SYSTEM

(75) Inventor: Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/524,223

(22) Filed: Jun. 15, 2012

(65) Prior Publication Data
US 2012/0315038 A1 Dec. 13, 2012

Related U.S. Application Data

(63) Continuation of application No. 12/292,337, filed on Nov. 17, 2008, now abandoned, which is a continuation of application No. PCT/JP2006/310442, filed on May 25, 2006.

(51) Int. Cl.
*H04J 14/00* (2006.01)

(52) U.S. Cl.
USPC .............................. 398/48; 398/72

(58) Field of Classification Search
USPC ...................................... 398/48, 72
See application file for complete search history.

(56) References Cited

U.S. PATENT DOCUMENTS

| | | | |
|---|---|---|---|
| 6,333,800 B1 * | 12/2001 | Suemura et al. ................ 398/9 |
| 6,429,955 B1 * | 8/2002 | Suemura et al. ................ 398/48 |
| 6,445,473 B1 * | 9/2002 | Suemura et al. ................ 398/48 |
| 7,330,656 B2 | 2/2008 | Lee et al. | |
| 7,738,790 B2 | 6/2010 | Nozue et al. | |
| 8,023,825 B2 * | 9/2011 | Gerstel et al. ................ 398/83 |
| 8,027,585 B2 * | 9/2011 | Yokoyama ..................... 398/50 |
| 2001/0017722 A1 * | 8/2001 | Takachio et al. ............... 359/124 |
| 2001/0033400 A1 * | 10/2001 | Sutherland et al. ............. 359/15 |
| 2002/0048067 A1 * | 4/2002 | Handelman et al. .......... 359/139 |
| 2002/0131689 A1 * | 9/2002 | Feuer et al. ...................... 385/24 |
| 2002/0135843 A1 * | 9/2002 | Gruia ............................. 359/167 |
| 2003/0043430 A1 * | 3/2003 | Handelman ..................... 359/128 |
| 2003/0214980 A1 * | 11/2003 | Tanaka et al. .................. 370/536 |
| 2005/0226620 A1 * | 10/2005 | Feuer et al. ...................... 398/83 |
| 2006/0013592 A1 * | 1/2006 | Isomura et al. ............... 398/152 |
| 2008/0013950 A1 * | 1/2008 | Boudreault et al. ............ 398/59 |

(Continued)

FOREIGN PATENT DOCUMENTS

JP 2006-81014 3/2006
WO 95/19689 7/1995

OTHER PUBLICATIONS

International Search Report for PCT/JP2006/310442, mailed Aug. 29, 2006.

(Continued)

*Primary Examiner* — Nathan Curs
*Assistant Examiner* — Tanya Ngo
(74) *Attorney, Agent, or Firm* — Staas & Halsey LLP

(57) ABSTRACT

In an optical access network system in which a relay station receives a wavelength multiplexed and time-division multiplexed optical signal (WDM optical signal) from an optical network, and the relay station transmits optical signals having specified wavelengths to subscriber units, the relay station demultiplexes the WDM optical signal into a plurality of groups with one group having a plurality of optical signals having a fixed wavelength interval between signals, then divides the optical signals of each group into k branches (k is the number of subscriber units) and inputs the signals to optical switches, and by turning ON/OFF the optical switches such that they are spaced in time, inputs the branched optical signals to the respective specified subscribers units.

16 Claims, 15 Drawing Sheets

(56) References Cited

U.S. PATENT DOCUMENTS

| | | | |
|---|---|---|---|
| 2008/0232800 A1* | 9/2008 | Jensen | 398/48 |
| 2009/0185804 A1* | 7/2009 | Kai et al. | 398/48 |
| 2010/0034532 A1* | 2/2010 | Ghelfi et al. | 398/2 |
| 2010/0166425 A1* | 7/2010 | Onaka | 398/79 |
| 2011/0085801 A1* | 4/2011 | Palacharla | 398/48 |

OTHER PUBLICATIONS

Office Action mailed Sep. 19, 2011 in co-pending U.S. Appl. No. 12/292,337.

Notice of Allowance mailed Mar. 16, 2012 in co-pending U.S. Appl. No. 12/292,337.

International Search Report for PCT/JP2006/310442 mailed Aug. 29, 2006.

Office Action for U.S. Appl. No. 12/292,337 issued Sep. 19, 2011.

Notice of Allowance and Fees for U.S. Appl. No. 12/292,337 issued Mar. 16, 2012.

U.S. Appl. No. 12/292,337, filed Nov. 17, 2008, Yutaka Kai, Fujitsu Limited.

\* cited by examiner

FIG. 2

| GROUP | WAVELENGTHS OF DATA OPTICAL SIGNALS | WAVELENGTH OF CONTROL OPTICAL SIGNAL |
|---|---|---|
| G1 | $\lambda_1, \lambda_9, \lambda_{17}, \lambda_{25}$ | $\lambda_a$ |
| G2 | $\lambda_8, \lambda_{16}, \lambda_{24}, \lambda_{32}$ | $\lambda_b$ |
| G3 | $\lambda_{15}, \lambda_{23}, \lambda_{31}, \lambda_7$ | $\lambda_c$ |
| G4 | $\lambda_{22}, \lambda_{30}, \lambda_6, \lambda_{14}$ | $\lambda_d$ |
| G5 | $\lambda_{29}, \lambda_5, \lambda_{13}, \lambda_{21}$ | $\lambda_e$ |
| G6 | $\lambda_4, \lambda_{12}, \lambda_{20}, \lambda_{28}$ | $\lambda_f$ |
| G7 | $\lambda_{11}, \lambda_{19}, \lambda_{27}, \lambda_3$ | $\lambda_g$ |
| G8 | $\lambda_{18}, \lambda_{26}, \lambda_{34}, \lambda_{10}$ | $\lambda_h$ |

FIG. 3

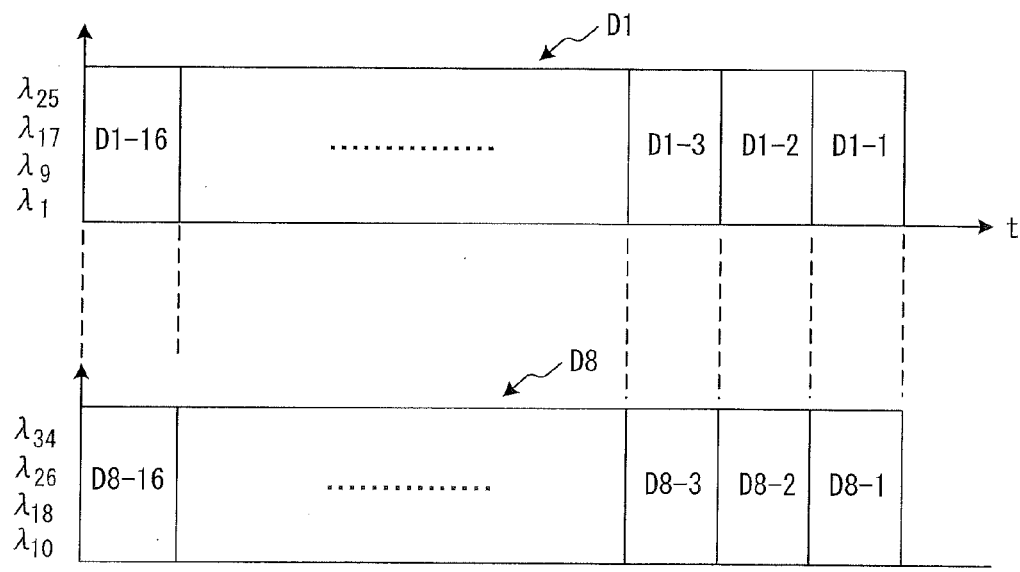

OPTICAL ACCESS NETWORK SYSTEM

CROSS-REFERENCE TO RELATED APPLICATIONS

This application is a continuation of U.S. Ser. No. 12/292,337, filed Nov. 17, 2008, which is a continuing application, filed under 35 U.S.C. §111(a), of International Application PCT/JP2006/310442, filed May 25, 2006, the contents of which are incorporated herein by reference.

BACKGROUND OF THE INVENTION

The present invention relates to an optical access network system that transmits high-speed optical signals to subscribers, and more particularly to an optical access network system that receives a multiplexed optical signal of a plurality of optical signals having different wavelengths from a broadband optical network, and transmits optical signals having specified wavelengths to subscribers.

Various methods have been proposed as a next-generation optical access network system that transmits optical signals to a subscriber as is without performing electrical conversion. The work of global standardization is advancing, and as examples of such an access system, there is (1) E-PON (Ethernet PON Ethernet frames that is obtained by modifying a B-PON (Broadband Passive Optical Network) for ATM frames, (2) GE-PON (Giga Ethernet PON) for Giga Bit Ethernet, and (3) Unique-standard G-PON. These PON systems do not use active elements that perform electrical-to-optical conversion in the network, such as in the case of ADS (Active Double Star), but rather comprise only passive optical parts, which make it possible for a low-cost End-to-End optical network. Moreover, even though equipment cost is high, adoption of a WDM-PON that uses a Wavelength Division Multiplex (WDM) signal for larger capacity is being investigated because it lowers the unit cost per bit. Ethernet is a registered trademark.

FIG. 16 is a drawing of a conventional GE-PON, in which a center station 2 that is connected to the Internet or Broadband Ethernet 1 is connected to users 3 by optical paths 5, $6_1$, $6_2$, $6_3$, . . . via an optical coupler 4. An Optical Line Terminal (OLT), which is the center station 2, has a 100/1000 BASE-T or 1000 BASE-SX/LK interface. A 10/100 BASE interface subscriber unit (Optical Network Unit: ONU) 3a and a personal computer 3b, which is the user terminal that is connected to the ONU, are located at subscribers' homes $3_1$, $3_2$, $3_3$, . . . .

The maximum distance between the center station 2 of the communication carrier and the users $3_1$, $3_2$, $3_3$ (distance between access intervals) is approximately 20 km, and by using a wavelength of 1490 nm for DOWN optical signals, and a wavelength of 1310 nm for UP optical signals, 1 Gbps communication is performed in both directions simultaneously.

The center station 2 transmits Ethernet frames that were received from the Internet or broadband Ethernet 1 and destined for users $3_1$, $3_2$, $3_3$ to an optical transmission path 5. The optical coupler 4 splits the DOWN Ethernet frames to a maximum of 32 branches, and transmits them to optical transmission paths $6_1$, $6_2$, $6_3$, . . . , and the ONU unit 3a of each user $3_1$, $3_2$, $3_3$, . . . extracts out its own respective packet, and inputs it to the personal computer 3b. Furthermore, the ONU 3a converts the transmission data from the personal computer 3b of each user $3_1$, $3_2$, $3_3$, . . . to an optical signal and transmits the signals to the optical transmission paths $6_1$, $6_2$, $6_3$, . . . , and the optical coupler 4 combines the signals and sends them to the center station 2.

FIG. 17 is a drawing of a conventional WDM-PON, where the maximum distance between the communication carrier and user is approximately 20 km, and communication is performed by multiplexing 32 optical signals having different wavelengths. The wavelengths of the optical signals that are used for UP and DOWN communication are the same, $\lambda1$ to $\lambda32$, and DOWN and UP communication are performed alternately (ping-pong transmission). A transmission unit (Tx) at a relay station of the communication carrier multiplexes 32 optical signals $\lambda1$ to $\lambda32$ having different wavelengths that were modulated with the data destined for each subscriber at an optical multiplexer (MUX) 3a, and outputs the multiplexed signal to a transmission path 7 via an optical circulator 3b. An optical multiplexing/demultiplexing filter (MUX/DMUX) 8 receives a Wavelength-Division Multiplexed optical signal (WDM optical signal), and divides that signal into optical signals $\lambda1$ to $\lambda32$ for each wavelength, and inputs the signals to the ONU units $9_1$ to $9_{32}$, which are the subscriber units. The ONU units $9_1$ to $9_{32}$ convert the signals to electrical signals and input the signals to the personal computers (not shown in the figure). Moreover, the personal computers of the subscribers input transmission data to the ONU units $9_1$ to $9_{32}$, then those ONU units $9_1$ to $9_{32}$ modulate and transmit the signals of the wavelengths $\lambda1$ to $\lambda32$, and the optical multiplexing/demultiplexing filter 8 combines the signals having different wavelengths that were output from the ONU units $9_1$ to $9_{32}$, and outputs the result to the transmission path 7. The optical circulator 3b located at the relay station of the communication carrier inputs the received optical signal to an optical demultiplexing filter (DMUX) 3c of a receiving unit (Rx), and that demultiplexing filter 3c separates and outputs optical signals $\lambda1$ to $\lambda32$ for each wavelength.

Moreover, as related art, there is a communication network in which PONs are connected in a ring shape such that transmission is possible in both directions, with a plurality of terminals connected to each PON such that communication can be performed among the terminals (Refer to WIPO No. WO95/19689 (Japanese Patent Publication No. H9-510053)). In the prior optical communication network, communication channels between terminals are multiplexed using various wavelengths, and use wavelengths that are assigned by a wavelength assignment unit to perform communication between terminals.

In the case of a PON system, a network can be created using inexpensive passive optical elements, however, there is a problem in that it is possible to use only a bandwidth of approximately 30 to 100 Mbps per subscriber, and high-speed communication exceeding 100 Mbps is not possible. Moreover, in a PON system, the network is constructed such that branching is performed by an optical coupler, so the same signal is distributed to all of the subscriber units that are connected to that optical coupler. Therefore, the danger of communication contents being decoded increases, making it impossible to maintain physical secrecy, and thus in a certain sense, the system can be said to be the same as a public wireless LAN. As can be seen from the above explanation, a conventional PON system has the disadvantage in that there is insufficient security for financial or business uses.

On the other hand, in a WDM-PON, it is possible to assign one wavelength for each user, and thus it is possible to maintain physical secrecy on the ONU side. However, since WDM optical signals are used, the number of users that can use a system is limited to a few tens of users due to restrictions of the number of multiplexed wavelengths, and to build a WDM- PON system, an enormous amount of fiber optic cables which connect between the communication carrier and users is necessary, which is reflected in the cost of the fiber optic equipment. On the ONU side as well, when WDM optical signals are used, signal wavelength management of each individual ONU is necessary, which increases the cost of the ONU terminal. In addition, in a WDM-PON, it is possible to maintain sufficient bandwidth, however, wasted bandwidth occurs due to ping-pong transmission.

SUMMARY OF THE INVENTION

Taking the aforementioned problems into consideration, the object of present invention is to provide an optical access network system that is capable of expanding bandwidth and increasing number of subscribers.

Another object of the present invention is to provide an optical access network system for which long-distance transmission and tree-shaped or star-shaped network topology can be applied such that it is widely used from access to a metro area.

Moreover, another object of the present invention is to provide an optical access network system that takes into consideration physical security such that even enterprise users can feel at ease in using the system.

Furthermore, another object of the present invention is to provide an optical access network system that can lower cost by increasing the number of users per system.

A first form of the present invention is an optical access network system comprising a relay station that receives wavelength multiplexed optical signals (WDM optical signal) from an optical network, and transmits optical signals having specified wavelengths to subscriber units, wherein the relay station comprises: optical demultiplexing means for demultiplexing a WDM optical signal into a plurality of optical signals having fixed wavelength intervals between them as one group; optical branching means for dividing the demultiplexed group of optical signals into a plurality of branches; and switching means for transmitting the divided group of optical signals to specified subscriber units. The optical switching means comprises a plurality of optical semiconductor amplifiers having a switching function for turning ON/OFF a connection between input ports and output ports.

The group of optical signals is created by multiplexing optical signals transmitted to subscriber units that have been spaced in time and by shifting the times when the plurality of optical semiconductor amplifiers are to be turned ON/OFF, specified optical signals are input to specified subscriber units.

The group of wavelength multiplexed optical signals comprises optical signals that transmit subscriber data, and a control optical signal having a different wavelength from the wavelengths of the data optical signals, and for each group, the relay station comprises a demultiplexing filter for demultiplexing the control optical signal, and a control circuit for performing switching of high-speed switching elements of the optical switching means using the demultiplexed control optical signal.

A subscriber unit has a wavelength selection filter that separates optical signals of each wavelength from the input optical signals and inputs each of the optical signals to respective subscriber terminals, or a subscriber unit has a wavelength selection filter that separates out optical signals of each wavelength from the input wavelength multiplexed optical signal, and a decoding circuit that decodes signals that were encoded on the transmission side using the optical signals that were separated out, and inputs the result to subscriber terminals.

A second form of the present invention is an optical access network system in which the DOWN transmission path is separate from the UP transmission path. When the control optical signal is phase modulated, the relay station comprises: an optical modulation unit that performs intensity modulation of the control optical signal using data that is transmitted from a subscriber unit and outputs the result, and multiplexing means that multiplexes the optical signals that are output from the optical modulation units of each group and transmits the result to the transmission side via a transmission path that differs from the DOWN transmission path. Moreover, the relay station comprises a transmission data multiplexing unit that demodulates the transmission data input by optical signals from a plurality of subscriber units, and multiplexes that plurality of transmission data, and the optical modulation unit performs the intensity modulation of the control optical signal using the multiplexed transmission data.

A third form of the invention is an optical access network system that performs bi-directional transmission over one fiber optic transmission path, where each subscriber unit comprises an optical transmitter that modulates an optical signal having a wavelength that is different from the wavelength of a DOWN optical signal with transmission data and outputs the result, and the relay station comprises: a combination means for shifting in time and combining the optical signals that were input from said transmitters of each of the subscriber units to output an optical signal having one wavelength; a multiplexing unit that multiplexes said optical signals that were input from the combination means of a plurality of groups, and an optical coupler that transmits an optical signal that was output from the multiplexing unit to the transmission side by the same transmission path as the DOWN transmission path; and by separating the optical signals that were transmitted from the subscriber side along the transmission path on the transmission side, bi-directional transmission is performed using one fiber optic transmission path.

BRIEF DESCRIPTION OF THE DRAWINGS

FIG. 2 is a drawing that explains the wavelengths of the optical data signals and control signals that are assigned to groups.

FIG. 3 is a drawing for explaining the wavelength multiplexed and time-division multiplexed status for each group.

FIG. 7 is a drawing explaining the optical path of a control signal having a wavelength λa.

DESCRIPTION OF THE PREFERRED EMBODIMENTS

(A) Overview of the Invention

Figure 1:
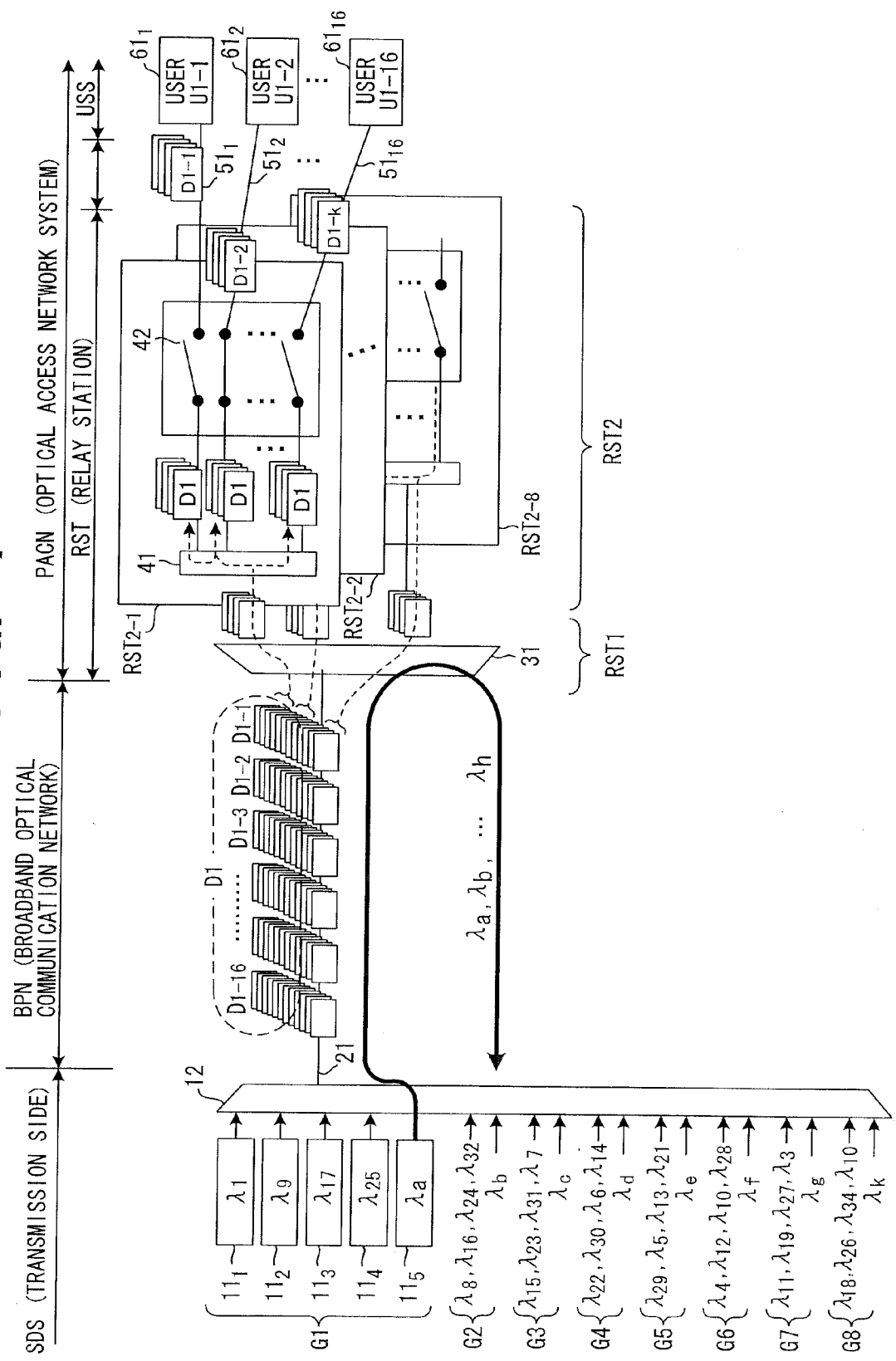
FIG. 1 is a drawing showing the overall communication network system of the present invention.

FIG. 1 is a drawing showing the overall construction of a communication network system of the present invention, where the transmission side SDS, which includes providers, video distribution centers, telephone exchange stations, mobile communication companies or the like, is connected to an optical access network system PACN via a broadband communication network BPN, and on the optical access network side PACN, relay stations RST are connected with the user side USS by optical transmission paths. The relay stations RST are divided into first and second relay stations RST1, RST2, and the optical access network system PACN is built in a tree shape. The number of users that are allowed for one relay station RST is k·N, which are divided into a maximum of N number of groups of k users each. There are second relay stations RST2-1 to RST2-8 for each group, and expansion is possible in group units. In the figure, the maximum number of groups is N=8, where one group comprises k=16 users U1-1 to U1-16.

In a case where a relay station RST is able to handle up to a maximum of 40 waves of WDM optical signals (wavelength multiplexed signals), the transmission side SDS comprises four wave data transmitters $11_1$ to $11_4$ and one wave control transmitter $11_5$ per group, so by combining the four data waves and one control wave, there is a total of five waves assigned to one group. The wavelengths of the five waves that are assigned to each group are spaced such that there is no Four Wave Mixing (FWM). That is, of the 40 waves, 32 continuous waves are for data, and 8 continuous waves are for control, where four waves (wavelengths: λ1, λ9, λ17, λ25) having a fixed wavelength interval are selected from the optical signals of these 32 continuous waves for the data of group 1, and one wave (wavelength: λa) is selected from the 8 continuous waves for control of group 1. Similarly, optical signals are assigned for data and control of other groups. As a result, the relationship between groups 1 to 8 and the wavelengths of the optical signals for data and control for the groups is as shown in FIG. 2.

The transmitters $11_1$ to $11_4$ of group 1 shift in time and modulate the four optical signals (wavelengths: λ1, λ9, λ17, λ25) with the user data D1-1 to D1-16 of group 1, and an optical multiplexer 12 performs wavelength multiplexing of the modulated optical signals, then sends the result to an optical transmission path 21. The transmitters of the other groups i (i=1 to 8) similarly shift in time and modulate the four optical signals with the user data Di-1 to Di-16 of the respective group i, and the optical multiplexer 12 performs wavelength multiplexing of all the modulated optical signals and sends the result to the optical transmission path 21. As a result, as shown in FIG. 3, wavelength multiplexing and time division multiplexing is performed for a total of 32 waves, and the optical signals are sent to the relay station RST via the optical transmission path 21. Wavelength multiplexing and time division multiplexing are also performed for the control optical signals of each group and sent to the relay station RST via the optical transmission path 21 in the same way as the data optical signals.

In the description of the present invention, the term 'time division multiplexing' means to shift the signals in time and perform multiplexing, where the destination of the user data assigned to each timeslot is not fixed, but dynamically changes. The control data specifies the user destination for the data of each timeslot.

A cyclic multiplexing/demultiplexing filter 31 divides out the wavelength multiplexed optical signals into data optical signals and control optical signals for each group, and combines the optical signals of each group, then inputs the results to the second relay stations RST2-1 to RST2-8 from ports corresponding to each respective group. The second relay stations RST2-1 to RST2-8 comprise a branch coupler 41 and high-speed optical switch unit 42. The branch coupler of group G1 branches four wave WDM optical signals (wavelengths: λ1, λ9, λ17, λ25) that were input for group 1, and inputs the results to the 16 input ports of the high-speed switch unit 42. The high-speed switch unit 42 comprises 16 optical switches that turn ON/OFF the connections between the 16 input ports and 16 output ports, and each optical switch shifts the optical switching time based on the control data that is sent by the control optical signals, or in other words, performs ON/OFF control in order at the time divided timeslot periods. By doing this, the WDM optical signals (D1-1 to D1-16) for each user that are assigned to each of the timeslots are input to the subscriber units $61_1$ to $61_{16}$ of the users by way of the optical transmission paths $51_1$ to $51_{16}$.

From the operation described above, the WDM optical signals are shifted in time and distributed to the users, so only the pertinent WDM optical signal is distributed to the subscriber units $61_1$ to $61_{16}$ of the target users. As a result, it becomes possible to maintain physical secrecy. Moreover, when secrecy is not necessary, or when it is preferred that low-cost service be provided, it is possible to further increase the user capacity by further allocating each of the four waves of WDM optical signals that are distributed to the subscriber units $61_1$ to $61_{16}$ to one user.

When phase modulation is performed for the control optical signals that are received from the transmission side SDS, transmission of UP data from the subscriber units is performed by performing intensity modulation of the control optical signals with the transmission data (UP data). In other words, the subscriber units $61_1$ to $61_{16}$ use a 1.3 μm band signal to transmit transmission data to the second relay station RST2 bi-directionally over one cable, and the second relay station RST2 performs time division multiplexing of the UP signals from the subscriber units $61_1$ to $61_{16}$ to generate one high-speed data signal, then an optical modulator (not shown in the figure) performs intensity modulation of the control optical signals using that data signal, and a multiplexing unit combines the optical modulated signals of each group and transmits the result to the transmission side via a transmission path (not shown in the figure) that is different from the DOWN transmission path. With this construction, it is possible to create subscriber units inexpensively.

When it is desired to reduce cost by performing bi-directional transmission using one optical transmission path, an optical modulation unit, which uses transmission data to modulate an optical signal having a different wavelength from that of the transmission side, is mounted in the subscriber unit, and that subscriber unit transmits an optical modulated signal to the second relay station RST2, after which that second relay station RST2 performs time division multiplexing of the optical modulated signals that were sent from the 16 subscriber units for each group, then performs wavelength multiplexing of the time division multiplexed optical signals for each group and returns the result as a WDM optical signal.

(B) First Embodiment

Figure 4:
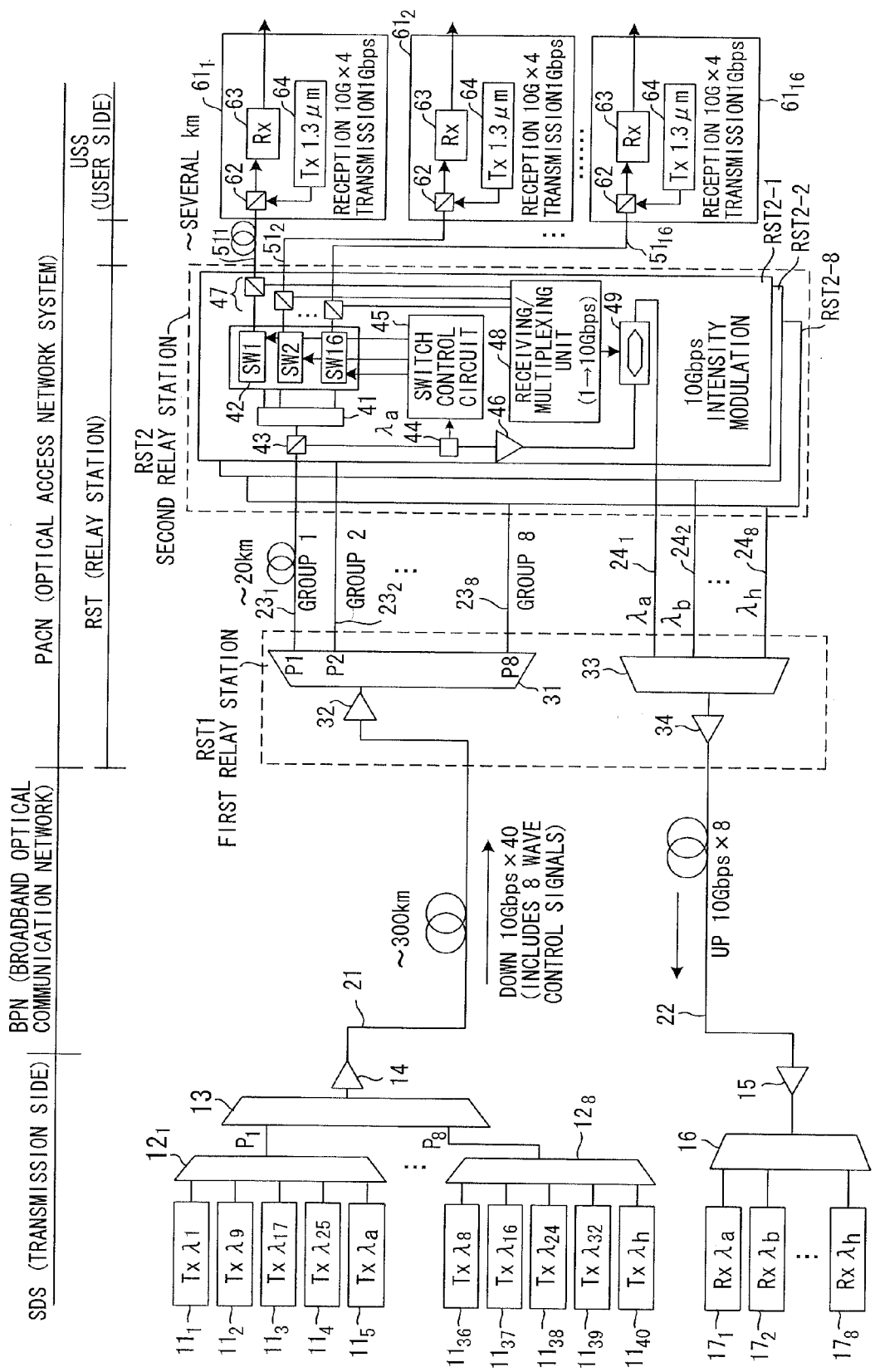
FIG. 4 is a drawing showing the overall construction of an optical communication network system that comprises a first embodiment of the optical access network system of the present invention.

FIG. 4 is a drawing showing the overall construction of an optical communication network system that comprises the optical access network system of a first embodiment of the invention, where the transmission side SDS is connected to the optical access network system PACN via a broadband optical communication network BPN, and where in the optical access network system PACN, relay stations RST are connected to the user side by optical transmission paths.

The maximum distance between the transmission side SDS and a relay station RST is 300 km, the maximum distance between a first and second relay station RST1, 2 is 20 km, and the distance between a relay station RST and the user side USS is several km or less. The relay stations RST are divided into first and second relay stations RST1, RST2, and the optical access network PACN is built in a tree shape from the first relay station to a subscriber unit. The allowable number of users for one relay station RST is k·N, where k·N users are divided in to a maximum of N number of groups k by k. Second relay stations RST2-1 to RST2-8 are provided for each group, and construction is such that expansion is possible in group units. In the figure, the maximum number of groups is N=8, with a group comprising k=16 users U1-1 to U1-16. The optical access network system PACN is not limited to a tree shape, and could also be built in a star shape.

(a) DOWN Transmission

In the case where a relay station RST can handle WDM optical signals (wavelength multiplexed signals) for up to a maximum of 40 waves, the transmission side SDS comprises data transmitters $11_1$ to $11_4$, ..., $11_{36}$ to $11_{39}$ for four waves per group, and control transmitters $11_5$, ..., $11_{40}$ for one wave per group, so there is a total of four waves for data and one wave for control, and five waves are assigned for one group. The interval between the five wavelengths assigned to each group is an interval in which four-wave mixing does not occur, for example, an interval of 400 GHz, where the relationships between the groups 1 to 8, and the wavelengths of the data signals and control signals assigned to each group are as shown in FIG. 2. The DOWN optical signals use 40 waves in C-band which is a 1.5 µm band.

The transmitters $11_1$ to $11_4$ for group 1 shift four optical signals (wavelengths: $\lambda 1, \lambda 9, \lambda 17, \lambda 25$) in time in conformity with the time slot of the user data D1-1 to D1-16 for group 1, or in other words, perform time-division modulation, and transmitter $11_5$ shifts the optical signals (wavelength: $\lambda a$) in time in conformity with the time slot of the control data for each user of the group 1, or in other words, performs time-division modulation, then a multiplexer $12_1$ performs wavelength multiplexing of the time-division modulated optical signals. The modulation speed is 10 Gbps.

Other groups operate similarly. For example, The transmitters $11_{36}$ to $11_{39}$ for group 8 perform time-division modulation of four optical signals for data (wavelengths: $\lambda 8, \lambda 16, \lambda 24, \lambda 32$) based upon the user data D8-1 to D8-16 for group 8, and transmitter $11_{40}$ performs time-division modulation of the optical signals for control (wavelength: $\lambda h$) based upon the control data for each user of group 8, or in other words, performs time-division modulation, then a multiplexer $12_8$ performs wavelength multiplexing of the time-division modulated optical signals.

The multiplexers $12_1$ to $12_8$ could also be commercially sold MUX filters having dielectric multilayer film that is overlapped in multiple stages, or they could also be AWG (Arrayed Waveguide Grating) or Fiber Bragg Grating (FBG). Arrayed Waveguide Grating (AWG) has the function as a multiplexer/demultiplexer, and the function of the demultiplexer separates the WDM optical signal into signals for each wavelength, and outputs the signals to a plurality of waveguide paths, and the function of the multiplexer performs optical multiplexing of the lights having different wavelengths that are input from the plurality of waveguide paths, and outputs the result as wavelength multiplexed light.

Wavelength groups can be arbitrarily configured. For example, groups can be divided according to services such that wavelengths $\lambda 1$ to $\lambda 8$ are assigned for providers, wavelengths $\lambda 9$ to $\lambda 16$ are assigned for audio (telephone), wavelengths $\lambda 17$ to $\lambda 25$ are assigned for video, and wavelengths $\lambda 26$ to $\lambda 32$ are assigned for other mobile uses. By doing so, it is possible to flexibly upgrade from a conventional FTTH system.

Multiplexer 13 multiplexes the WDM optical signals that are output from each of the multiplexers $12_1$ to $12_8$ (see FIG. 1 and FIG. 3), and an optical amplifier 14 amplifies the signal and sends the result to one optical transmission path 21. The modulation speed for each optical signal is 10 Gbps, and there are a total of 40 wavelengths, so the DOWN transmission speed is 10 Gbps×40. A cyclic multiplexing/demultiplexing filter, for example, a cyclic AWG can be used as the multiplexer 13. By designing the waveguide path, a cyclic AWG multiplexes the WDM optical signals for a plurality of groups that are input from a plurality of input ports P1 to P8 for each specified wavelength, and outputs the result to one output port. When a cyclic multiplexing/demultiplexing filter is used, it is possible to reduce the number of ports and thus it is possible to lower the cost, as well as expansion in group units becomes possible.

The optical amplifier 32 of the first relay station of the optical access network system PACN amplifies the WDM optical signal that is input from the optical transmission path 21, and the cyclic multiplexing/demultiplexing filter 31 demultiplexes the data/control optical signals for each group from the WDM optical signal and sends those signals from ports P1 to P8 that correspond to the respective groups to optical transmission paths $23_1$ to $23_8$. The cyclic multiplexing/demultiplexing filter 31 comprises a cyclic AWG (Arrayed Waveguide Grating), and demultiplexes the WDM optical signal that is input from one port to optical signals for each specified wavelength, the multiplexes these for each group and transmits the multiplexed optical signals for each group from specified port P1 to P8 to the optical transmission paths $23_1$-$23_8$. In other words, the cyclic multiplexing/demultiplexing filter 31 transmits the WDM optical signal ($\lambda 1, \lambda 9, \lambda 17, \lambda 25, \lambda a$) for group 1 to the optical transmission path $23_1$ from port P1, and similarly outputs WDM optical signals for groups 2 to 8 to optical transmission paths $23_2$ to $23_8$ from ports P2 to P8.

From the above, data and control optical signals for each group are input to the second relay stations RST2-1 to RST2-8 for each group via the optical transmission paths $23_1$ to $23_8$.

At the second relay RST2-1, a fixed demultiplexing filter 43 for group 1 demultiplexes the WDM optical signal that was input from the optical transmission path 23a, into optical signals for data having wavelengths λ1, λ9, λ17, λ25, and an optical signal for control having a wavelength λa, then inputs the former signals to a k-branch coupler 41, and inputs the latter signal to a 2-branch coupler 44. The k-branch coupler branches the input four wave WDM optical signals for group 1 (wavelengths: λ1,λ9,λ17,λ25) and inputs the branched four wave WDM optical signals to the 16 input ports of the high-speed switch unit 42. The 2-branch coupler branches the one wave control optical signal and inputs one to a switch control circuit 45, and the other to an optical amplifier circuit 46.

The high-speed switch unit 42 comprises 16 switches SW1 to SW16 that turn ON/OFF a connection between 16 input ports and 16 output ports, and based on control data that is sent in the control optical signal, the switch control circuit 45 shifts the switching timings of switches SW1 to SW16 one timeslot by one timeslot) and performs ON/OFF control. It is required that each of the 16 switches SW1 to SW16 has Tr and Tf characteristics (rise and fall characteristics) of a few ns or less. Therefore, as these switches, a Semiconductor Optical Amplifier (SOA) can be used for turning ON/OFF the conduction of optical signals at high speed by turning ON/OFF a bias power supply. From the above, by performing ON/OFF control of each semiconductor optical amplifier SOA based on the control data, the switch control circuit 45 is able to transmit four wave WDM optical signals that are assigned to specified timeslots to the subscriber units $61_1$ to $61_{16}$ of specified users via an optical coupler 47 and optical transmission paths $51_1$ to $51_{16}$.

For example, at a certain timeslot time T1, the switch element SW1 to which the subscriber unit $61_1$ is connected is turned ON, and all other switch elements are OFF, then at the next timeslot time T2, the switch element SW2 to which the subscriber unit $61_2$ is connected is turned ON, and all other switch elements are turned OFF, and after that similar ON/OFF control is performed in order to input the four wave WDM optical signals assigned to specified timeslots to the subscriber units $61_1$ to $61_{16}$ of specified users. Moreover, when a plurality of switch elements are turned ON at the same time, it is possible to perform a multicast (simultaneous broadcast).

The subscriber units, which are Optical Network Units (ONU) $61_1$ to $61_{16}$, comprise an optical coupler 62, receiver 63 and transmitter 64. The receiver 63 decodes packets from the wavelength multiplexed four wave WDM optical signal, and inputs them to the user's personal computer (not shown in the figure).

By turning ON/OFF the optical switching elements in a time sequence as described above, and inputting the four wave WDM optical signals of the specified timeslot to specified subscriber unit, it is possible for the optical switching elements to block the received signals for a subscriber unit from being distributed to other subscriber units, and thus it is possible to dramatically improve secrecy. In addition, by using optical switches as the switches, it is possible to reduce cost. That is, when switching is performed by electrical signals without using optical switches, a total of 16 branches× 2=32 converters for performing O/E and E/O conversion are necessary for the switch unit 42 so cost is greatly increased.

Examples of candidates for use as high-speed switching elements SW1 to SW16 are types that use a semiconductor optical amplifier (SOA), switches that use a compound semiconductor such as Gallium Arsenide (GaAs) that is used in laser diodes or the like, and field-effect optical switches that use PLZT thin film. In the case of a switch that uses SOA, the SOA also functions as an optical amplifier, so it is possible to compensate for optical distribution loss in the k-branch coupler 41, and is also effective in further increasing the transmission distance from the second relay station RST2 to the subscriber unit.

Moreover, in the construction shown in FIG. 4, a cyclic multiplexing/demultiplexing filter 31 is used, and this is effective for the case in which semiconductor optical amplifiers (SOA) are used as the switches SW1 to SW16. When a semiconductor optical amplifier (SOA) amplifies the four wave WDM optical signals all together, which are the WDM optical signals having a 100 GHz interval, for example, third harmonic wave distortion occurs due to a non-linear optical effect called Four Wave Mixing (FWM), so transmission characteristics greatly deteriorate. A cyclic multiplexing/demultiplexing filter 31 is also effective in solving this problem, so the wavelengths for each group shown in FIG. 2 can be sufficiently separated by an interval of 800 GHz, which has the effect of suppressing FWM.

Construction of a Subscriber Unit Receiver

Figure 5:
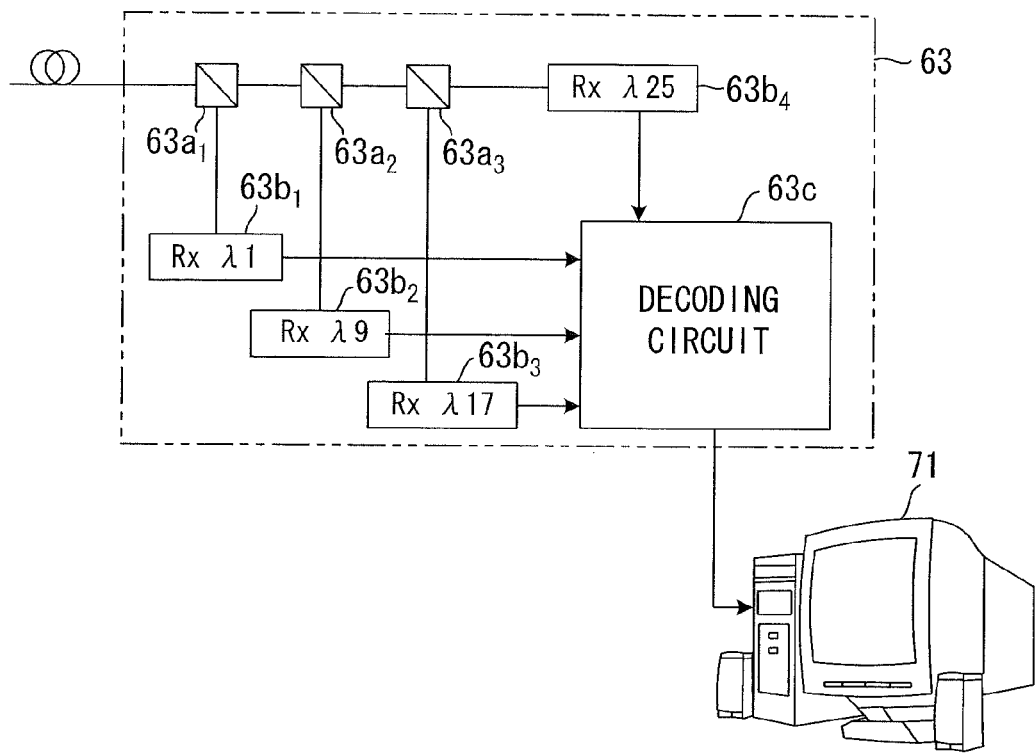
FIG. 5 is a first drawing showing the construction of a receiver in a subscriber unit.

FIG. 5 is a drawing showing first construction of a receiver for a subscriber unit of group 1, and shows an example in which desired signals are decoded from four wave WDM optical signals and input to the user's personal computer. The construction of the receivers for other groups is the same as shown in FIG. 5.

Assuming that an ciphering process is performed on the transmission side, and that four wave optical signals are modulated and transmitted according to the obtained ciphered data, a fixed wavelength selection filter $63a_1$ selects a signal light having wavelength λ1 from the WDM optical signals (wavelengths: λ1, λ9, λ17, λ25) of group 1, and inputs that signal light to the receiving unit $63b_1$, after which the receiving unit $63b_1$ demodulates the data that is sent in the signal light having wavelength λ1 and inputs the result to a decoding circuit 63c.

Next, a fixed wavelength selection filter 63a2 selects a signal light having wavelength λ9 from the WDM optical signals (wavelengths: λ9, λ17, λ25) that are output from the fixed wavelength selection filter $63a_1$, and inputs that signal light to the receiving unit $63b_2$, after which that receiving unit $63b_2$ demodulates the data that is sent in the signal lights having wavelength λ9, and inputs the result to a decoding circuit 63c. Similarly, a fixed wavelength selection filter $63a_3$ selects signal light having wavelengths λ17 and λ25 from the WDM optical signals (wavelengths: λ17, λ25) that are output from the fixed wavelength selection filters $63a_2$, and inputs the respective signal light to the receiving units $63b_3$ and $63b_4$, after which the receiving unit $63b_3$ demodulates the data that is sent in the signal light having wavelength λ17 and inputs the result to a decoding circuit 63c, and receiving unit $63b_4$ demodulates the data that is sent in the signal light having wavelength λ25 and inputs the result to a decoding circuit 63c.

The decoding circuit 63c performs a decoding process using the four wave data that was demodulated by each demodulation circuit to decode the data to the original data, and inputs that data to the personal computer 71. In other words, the decoding circuit 63c generates packet signals for each wavelength and stores the packets in an internal buffer, then when all of the four wave packets have been generated, uses those four packets to decode one desired packet, and inputs the result to the personal computer 71. When data is not ciphered, the four wave packets that are sent are input in order as is to the personal computer 71. As was described above, the data transmission speed for one wave is 10 Gbps, and by performing wavelength multiplexing for the four waves, the data transmission speed becomes 40 Gbps. Time-division multiplexing is performed for the user data for 16 users at this data transmission speed of 40 Gbps, so the average data transmission speed per user is 40/16=2.5 Gbps. This data transmission speed of 2.5 Gbps is remarkably faster than the conventional transmission speed of 30 to 100 Mbps, making high-speed transmission possible with this invention. Moreover, the allowable number of users that can be handled is 16 users per group, and transmission is possible for 8 groups at the same time, so a maximum of 16×8=128 users can be handled by one second relay station RST2-1 to RST2-8.

Figure 6:
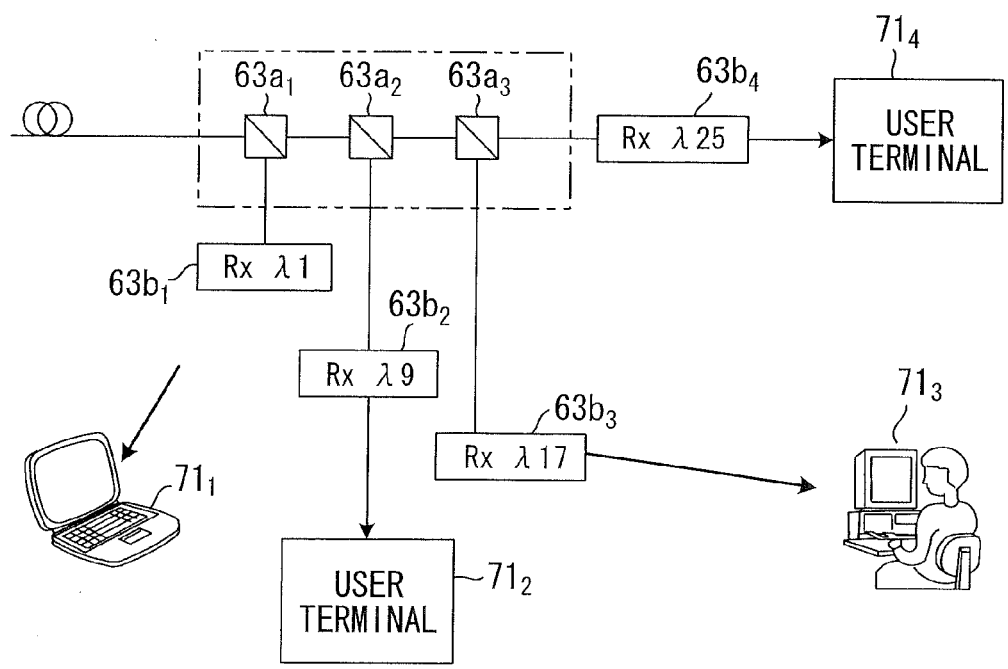
FIG. 6 is a second drawing showing the construction of a receiver in a subscriber unit.

FIG. 6 is a drawing showing a second example of construction of a receiver for a subscriber unit of group 1, and is an example of construction in which four wave WDM optical signals are allotted to users with one more wave allotted per user. This example of construction corresponds to the cases in which the user does not have such a great need for a high-speed line, or in which a normal level of security is allowed, so it is possible to quadruple the number of users that can be handled.

A fixed wavelength filter $63a_1$ selects a signal light having wavelength $\lambda 1$ from the WDM optical signals (wavelengths: $\lambda 1, \lambda 9, \lambda 17, \lambda 25$) of group 1, and inputs that signal light to the receiving unit $63b_1$, after which that receiving unit $63b_1$ demodulates the packet that is sent in that signal light having wavelength $\lambda 1$, and inputs that packet to the first user terminal $71_1$.

Moreover, a fixed wavelength filter $63a_2$ selects a signal light having wavelength $\lambda 9$ from the WDM optical signals (wavelengths: $\lambda 9, \lambda 17, \lambda 25$) that are output from the fixed wavelength selection filter $63a_1$, and inputs that signal light to the receiving unit $63b_2$, after which that receiving unit $63b_2$ demodulates the packet that is sent in that signal light having wavelength $\lambda 9$, and inputs that packet to the second user terminal $71_2$. Similarly, a fixed wavelength selection filter $63a_3$ selects signal light having wavelengths $\lambda 17$ and $\lambda 25$ from the WDM optical signals (wavelengths: $\lambda 17, \lambda 25$) that are output from the fixed wavelength selection filter $63a_2$, and inputs the respective signal light to the receiving units $63b_3$ and $63b_4$, after which receiving unit $63b_3$ demodulates the packets that is sent in the signal light having wavelength $\lambda 17$ and inputs that packet to the third user terminal $71_3$, and the receiving unit $63b_4$ demodulates the packet that is sent in the signal light having wavelength $\lambda 25$ and inputs that packet to the fourth user terminal $71_4$. The process described above is for DOWN transmission of group 1, however the second relay stations RST2-2 to RST2-8 operate in the same way for other groups as well.

As mentioned above, the data transmission speed for one wave is 10 Gbps, and by performing wavelength multiplexing for four waves, the data transmission speed becomes 40 Gbps. In the construction shown in FIG. 6, user data for 16×4 users is transmitted using time-division multiplexing at a data transmission speed of 40 Gbps, so the average data transmission speed per user is 40/(16×4) Gbps=625 Mbps, which is ¼ that of the case shown in FIG. 5. However, when compared with the conventional transmission speed of 30 to 100 Mbps, high-speed transmission is possible. Also, when increasing the number of users that can be handled, since the optical signal already comes close to houses, it is possible to increase users by using a normal electric signal switching device (router or switching hub).

The case in which N=8 and k=16 was explained above, however, generally, it is possible to effectively use a bandwidth with a maximum of N×k user per relay station. At the same time it is possible to create a flexible system that has both expandability and secrecy.

(b) UP Transmission

In UP transmission, a control optical signal that is branched by a 2-branch coupler 44 is used. In other words, part of a control signal light is input to a switch control circuit 45, however, the remaining light is used as is and is reused as the return signal wavelength for data that is transmitted from a subscriber unit. Therefore, when the transmission side SDS uses control data to modulate an optical signal having a wavelength of $\lambda a$, instead of performing intensity modulation, phase modulation is performed in which the optical power does not change even after modulation. The purpose of the control data that is superimposed on that control optical signal is for specifying the switching destination and the timing at which switching is performed, and since it is sufficient to have at least several ten Mbps, there is no problem even though phase modulation is performed.

The transmitters 64 of the subscriber units $61_1$ to $61_{16}$ all modulate 1.3 μm band optical signals using 1 Gbps UP transmission data, and transmit the optical modulation signals to the second relay station RST2-1 via optical transmission paths $51_1$ to $51_{16}$ bi-directionally over one cable. The reason for bi-directional transmission over one cable is to lower the cost of the subscriber units, and to lower the transmission cost from the subscriber units to the second relay station RST2. Therefore, 1.3 μm band optical signals are used for transmission as used in a GE-PON system.

The optical coupler 47 of the second relay station RST2-1 separates the 1.3 μm band optical signals that are input from the subscriber units $61_1$ to $61_{16}$, and inputs the signals to a receiving/multiplexing unit 48. The receiving/multiplexing unit 48 demodulates the transmission data of the subscriber units $61_1$ to $61_{16}$ from the 1.3 μm band optical signals, and shifts the demodulated transmission data of the subscriber units $61_1$ to $61_{16}$ in time, then multiplexes the data and generates a 10 Gbps high-speed data signal.

An optical amplifier 46 amplifies in the saturation range the control optical signal having a wavelength of $\lambda a$ that was branched by the 2-branch coupler 44, to make the power of the control optical signal constant and inputs the amplified signal to an optical modulation unit 49. The optical modulation unit 49 performs intensity modulation of the control optical signal using the 10 Gbps high-speed data that was input from the receiving/multiplexing unit 48, and sends that signal to the optical transmission path $24_1$. The optical modulation units for the other groups also perform intensity modulation of the control optical signals having wavelengths $\lambda b$ to $\lambda h$ using 10 Gbps high-speed data, and send the signals to the optical transmission paths $24_2$ to $24_8$. A multiplexer 33 of the first relay station RST1 multiplexes the optical signals that are input from the optical transmission paths $24_1$ to $24_8$, and an optical amplifier 34 performs optical amplification of the multiplexed WDM optical signal, then sends the signal to an UP transmission path 22 that is different from the DOWN transmission path 21, and transmits the signal to the transmission side SDS. On the transmission side SDS, an optical amplifier 15 amplifies the WDM optical signal, and a demultiplexing filter 16 demultiplexes the signal into optical signals for each wave length $\lambda a$ to $\lambda h$, then inputs the signals to receivers $17_1$ to $17_8$. The reason for keeping the UP transmission path different from the DOWN transmission path 21 is that due to the effect of interference, bi-directional transmission over one cable is not possible.

Figure 7:
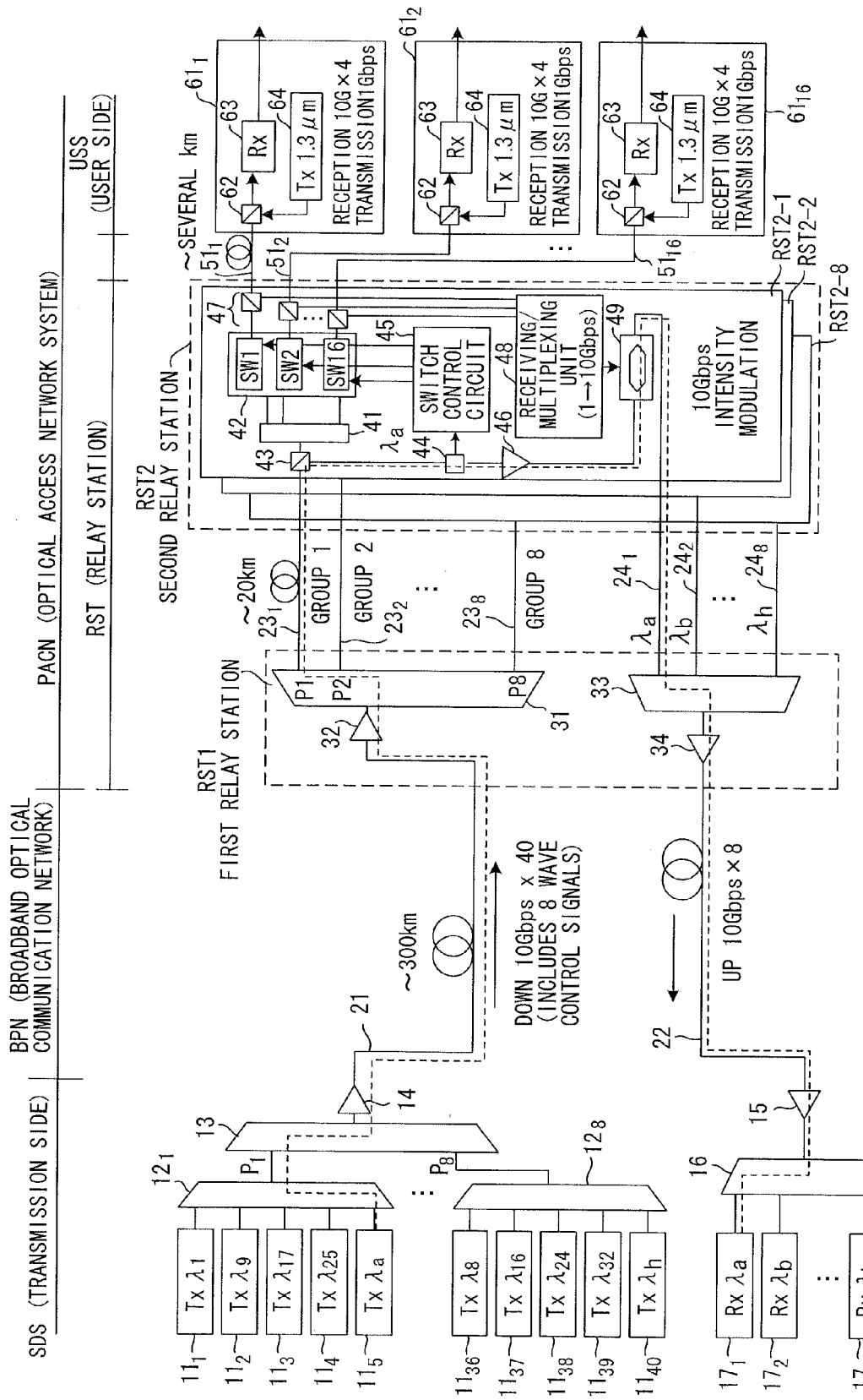

Using a dotted line, FIG. 7 shows the path of the control optical signal having a wavelength of $\lambda a$ for the optical communication network system shown in FIG. 4.

Figure 8:
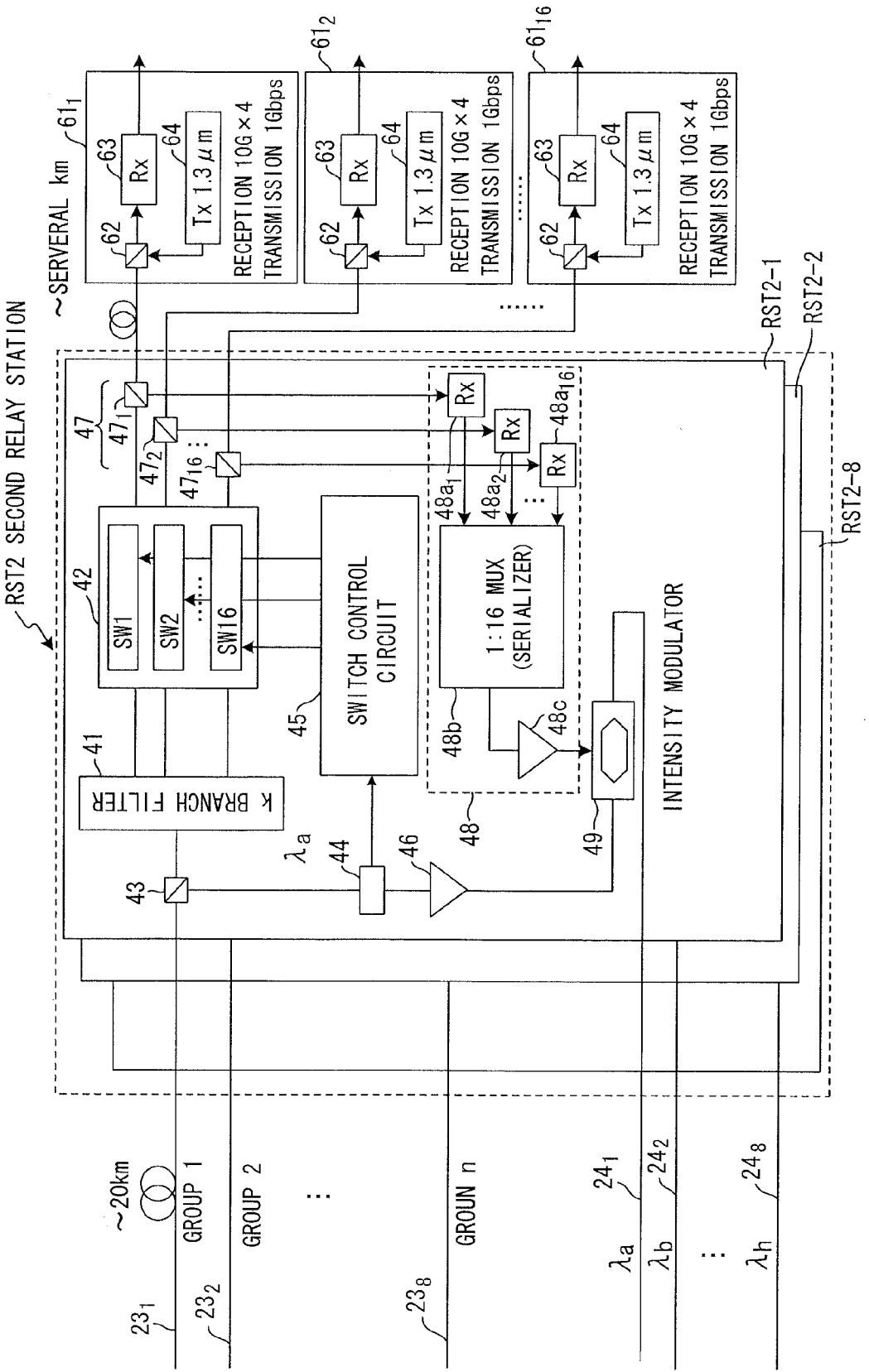
FIG. 8 is a drawing showing the construction of a receiving/multiplexing unit.

FIG. 8 is a drawing showing the construction of the receiving/multiplexing unit 48, where the same reference numbers are used for parts that are identical to those shown in FIG. 4 and FIG. 7. Optical signal receiving units $48a_1$ to $48a_{16}$ receive 1.3 μm band optical signals from the subscriber units $61_1$ to $61_{16}$ that have been separated by optical couplers $47_1$ to $47_{16}$, and demodulates the 1 Gbps UP transmission data and inputs the respective transmission data to a serializer 48b. By shifting the timing of the 1 Gbps UP transmission data and performing multiplexing, the serializer 48b generates 10 Gbps time-division multiplexed data. An amplifier 48c amplifies that time-division multiplexed data and inputs the result to an optical modulation unit 49. The optical modulation unit 49 uses the time-division multiplexed data to perform intensity modulation of the control optical signal.

(c) Construction of the Transmission Side

Figure 9:
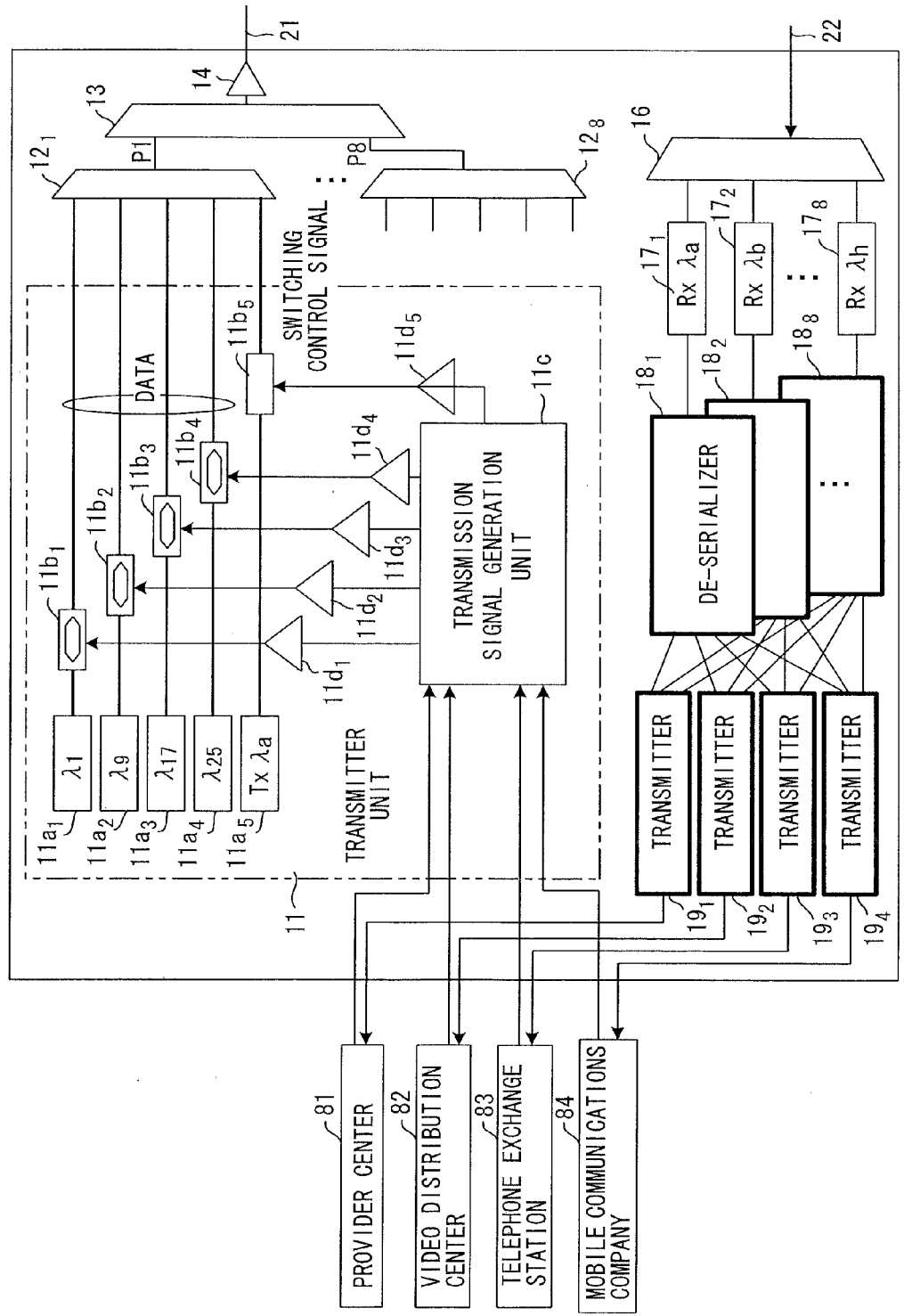
FIG. 9 is a drawing showing the construction of an Optical Line Terminal (OLT), which is a unit on the transmission side.

FIG. 9 is a drawing showing the construction of an Optical Line Terminal (OLT), which is a unit on the transmission side, where the same reference numbers are used for parts that are the same as those shown in FIG. 4. The construction of the transmission unit 11 for group 1 is shown in detail, and the other groups 2 to 8 have the same construction.

In transmission unit 11, optical signal generation units $11a_1$ to $11a_5$ generate data transmission signal light and control signal light for group 1. That is, the optical signal generation units $11a_1$ to $11a_4$ generate data signal light having wavelengths λ1, λ9, λ17, λ25, and optical signal generation unit $11a_5$ generates a control signal light having a wavelength of λa. Optical modulation units $11b_1$ to $11b_4$ perform intensity modulation of the data signal light using the transmission data that is output from the transmission signal generation unit 11c, and inputs the optical modulation signal to a multiplexer $12_1$. The optical modulation unit $11b_5$ performs modulation of the control signal light using the control data (switching control data) that is output from the transmission signal generation unit 11c, and inputs modulated optical signal to a multiplexer $12_1$. As shown in FIG. 5, at the second relay station, if intensity modulation of the control signal light is performed using the UP transmission data and returned to the transmission side, the optical modulation unit $11b_5$ performs phase modulation and does not perform intensity modulation. The multiplexer $12_1$ multiplexes the input 5 wave optical signal, and the cyclic multiplexing/demultiplexing filter 13 multiplexes the optical signal of each group and sends the result to the transmission path 21.

The transmission signal generation unit 11c shifts respectively the data and control data to be transmitted to the 16 users of group 1 one timeslot by one timeslot and performs multiplexing (time-division multiplexing), then inputs the data to the optical modulation units $11b_1$ to $11b_5$ via amplifiers $11d_1$ to $11d_5$. The data that is sent to each of 1b users is input to the transmission signal generation unit 11c from a provider center 81, video distribution center 82, telephone exchange station 83, mobile communications company 84, or the like. The transmission source for data that is sent to each user can be the same or different.

In the case where encoding is not performed and four waves are used for one user, the signal generation unit 11c divides the packet to be sent to the first user into 4-bit units, and inputs the four bits to optical modulation units $11b_1$ to $11b_4$ during a specified timeslot (for example, the first timeslot period). Next, the signal generation unit 11c divides the packet to be sent to the second user into 4-bit units, and sends the four bits to the optical modulation units $11b_1$ to $11b_4$ during the second timeslot period, then similarly inputs the data for each of the users to the optical modulation units $11b_1$ to $11b_4$. In addition, the signal generation unit 11c generates control data that specifies the transmission destination of the transmission data for each timeslot, and inputs that data to the optical modulation unit $11b_5$. By the processing described above, packets and control data for each user undergo time-division multiplexing and wavelength multiplexing and are sent to the user side.

On the other hand, in the case where ciphering is performed and data (packets) is transmitted, the signal generation unit 11c performs ciphering and creates four packets using the packet to be sent to the first user, inputs one bit for each packet to the optical modulation units $11b_1$ to $11b_4$ respectively during the first timeslot period. Next, the signal generation unit 11c performs ciphering and creates four packets using the packet to be sent to the second user, then inputs one bit for each packet to the optical modulation units $11b_1$ to $11b_4$ during the second timeslot period, after which the signal generation unit 11c similarly ciphers the packets for each user and inputs the packets to the optical modulation units $11b_1$ to $11b_4$. In addition, the signal generation unit 11c generates control data that specifies the transmission destination of transmission data for each timeslot, and inputs that data to the optical modulation unit $11b_5$. From the process described above, the ciphered packets and control data for each user undergoes time-division multiplexing and wavelength multiplexing, and are transmitted to the user side.

Figure 10:
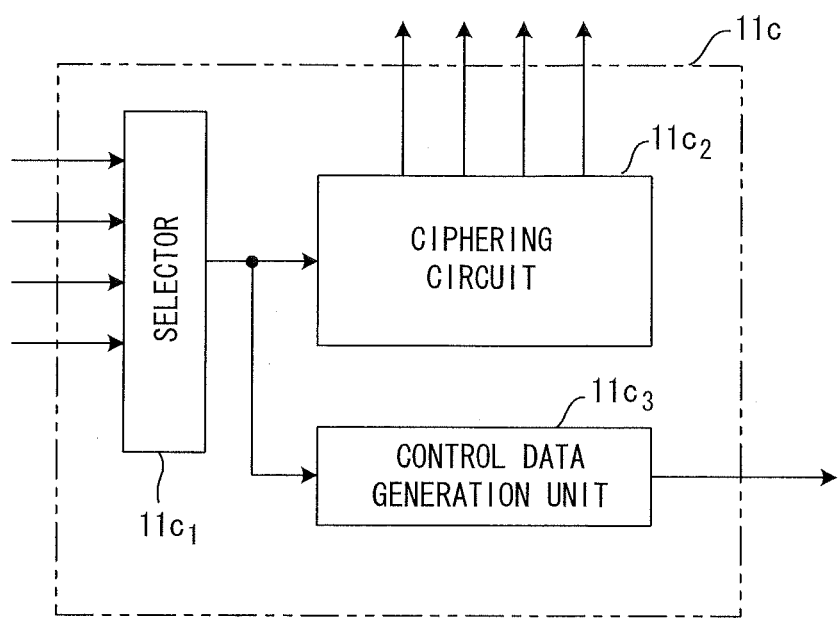
FIG. 10 is a drawing showing the construction of a signal generation unit for the case in which encoding is performed.

FIG. 10 is a drawing showing the construction of the signal generation unit 11c in the case when ciphering is performed, where a selector $11c_1$ selects for each timeslot the packets for the users that are input from a provider center 81, video distribution center 82, telephone exchange station 83, mobile communications company 84, and together with inputting the packets to an ciphering circuit $11c_2$, inputs the packets to a control data generation unit $11c_3$. The ciphering circuit $11c_2$ uses the input packets to perform ciphering and create four packets, then inputs one bit for each packet to the optical modulation units $11b_1$ to $11b_4$ at a specified speed during the timeslot periods. Moreover, a control data generation unit $11c_3$ identifies the destinations from the input packets and generates control data (switching control signal) and inputs that data to the operation modulation unit $11b_5$.

When one wave is used for one user, the signal generation unit 11c inputs the packets to be sent to the first to fourth user one bit at a time to the optical modulation units $11b_1$ to $11b_4$ during the first timeslot.

Next, the signal generation unit 11c inputs the packets to be sent to the fifth to eighth users one bit at a time to the optical modulation units $11b_1$ to $11b_4$ during the second timeslot, then similarly inputs in order the packets for four users one bit at a time to the optical modulation units $11b_1$ to $11b_4$. Moreover, the signal generation unit 11c generates control data that specifies the destination (subscriber unit) of the transmission data for each timeslot and inputs that data to the optical modulation unit $11b_5$. From the process described above, the packets and control data for each user undergo time-division multiplexing and wavelength multiplexing, and are transmitted to the user side. The transmission source of the packets to be sent to each user can be the same or different.

Returning to FIG. 9, a demultiplexing filter 16 demultiplexes the optical signals from the WDM optical signal that was input from the UP transmission path 22 for the wavelengths λa to λh, and inputs the signal to the receivers $17_1$ to $17_8$, after which the receivers $17_1$ to $17_8$ demodulate the data sent from the subscriber units of each of the groups 1 to 8, and input the results to the deserializers $18_1$ to $18_8$ of the corresponding group. Each deserializer $18_1$ to $18_8$ converts the input serial data (time-division multiplexed data for 16 users) to parallel data, inputs the transmission data for each user to the transmitters $19_1$ to $19_4$ that correspond to the respective destination centers, and transmits the data to each center 81 to 84.

(d) Signal Switching

Figure 11:
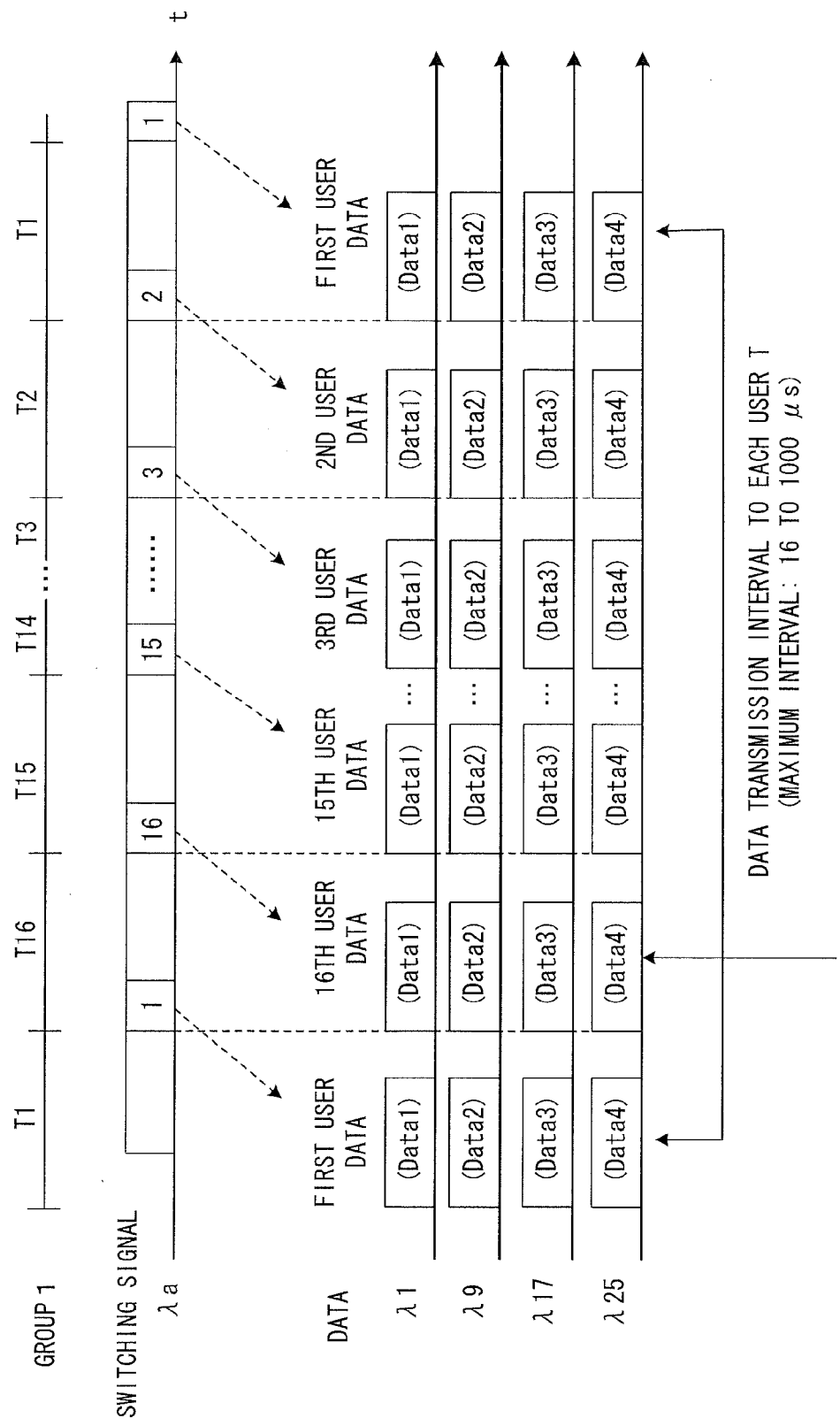
FIG. 11 is a drawing explaining the signal-switching format.

FIG. 11 is a drawing explaining the signal switching format, and shows the case for group 1 when there is 16 users per group and 4 wavelength is used for each user. In the timeslot T1 on the right side, data for the first user is transmitted, in the timeslot T2, the data for the second user is transmitted, in the timeslot T3, the data for the third user is transmitted, . . . , in the timeslot T15, the data for the fifteenth user is transmitted, and in the 16th timeslot, the user data for the sixteenth user is transmitted. In this case, the switching control signal is transmitted before the data, for example, one timeslot before, and the switching signal specifies the destination for the data after the next timeslot.

In the case of transmitting one packet in one wave for each timeslot, the data time width for one wave in each timeslot is 1 to several 10 microseconds (μsec). This is because a packet length is 1 kbyte to several 10 kbytes, and the data transmission speed for one wave is 10 Gbps. As a result, the maximum transmission interval for each user is approximately 16 to 1000 microseconds (μsec). In other words, the time width of each timeslot and the transmission interval T are variable.

Figure 12:
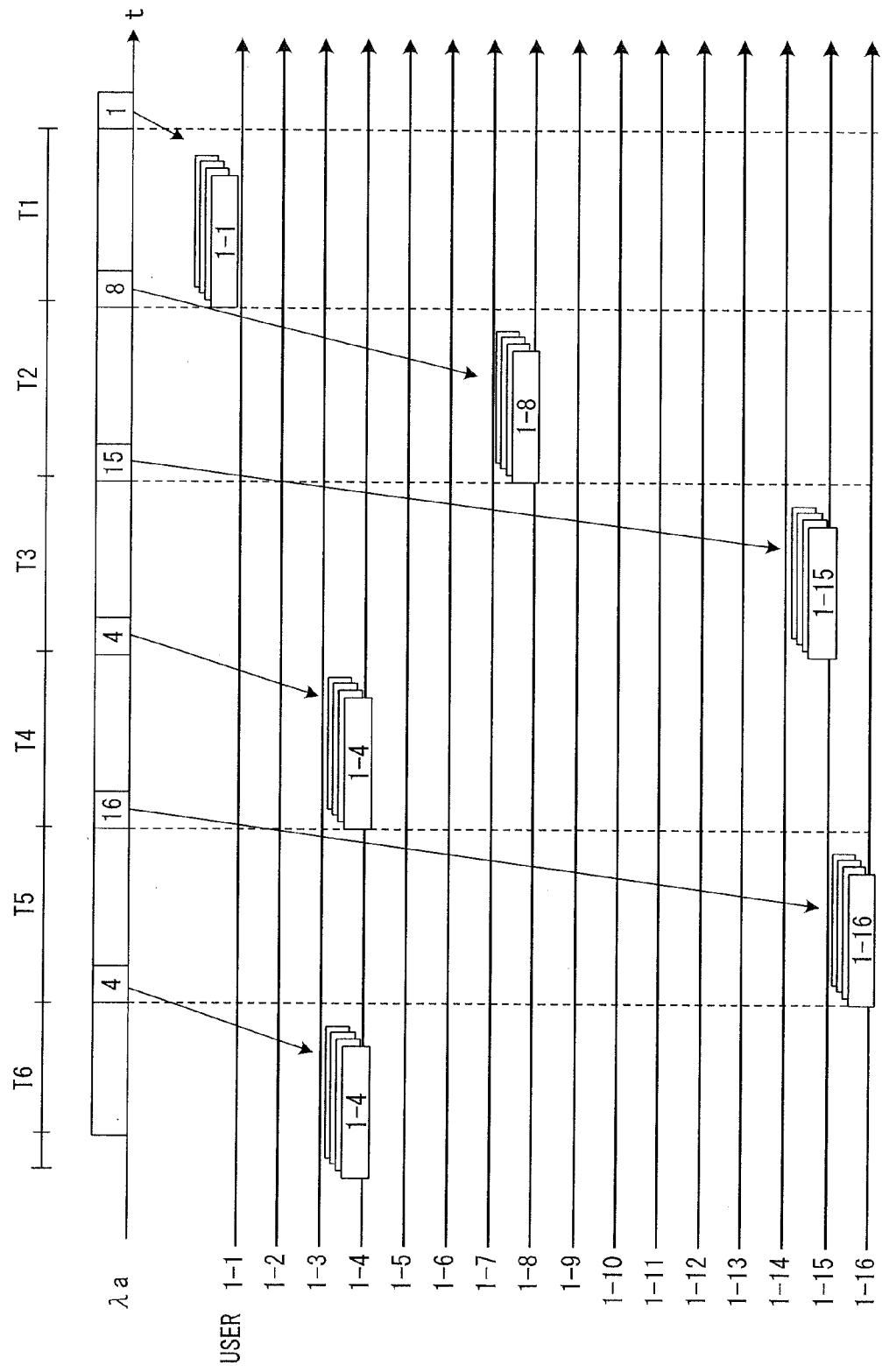
FIG. 12 is a drawing explaining the signal-switching timing.

FIG. 12 is a drawing that explains the signal switching timing, and shows the case for group 1. In timeslot T1, the data for the first user 1-1 is transmitted, in timeslot T2, the data for the eighth user 1-8 is transmitted, in timeslot T3, the date for the fifteenth user 1-15 is transmitted, and assuming that the transmission is performed in the same way after that, the switching signal is transmitted before the data, for example, one timeslot before, and this switching signal specifies the destination of the data for the next timeslot. In other words, based on the switching signal that was received one timeslot before, the switching control circuit 45 (see FIG. 4) sets the optical switch that will be turned ON/OFF for the current timeslot, then performs ON/OFF control and transmits an optical signal to a specified user.

Figure 13:
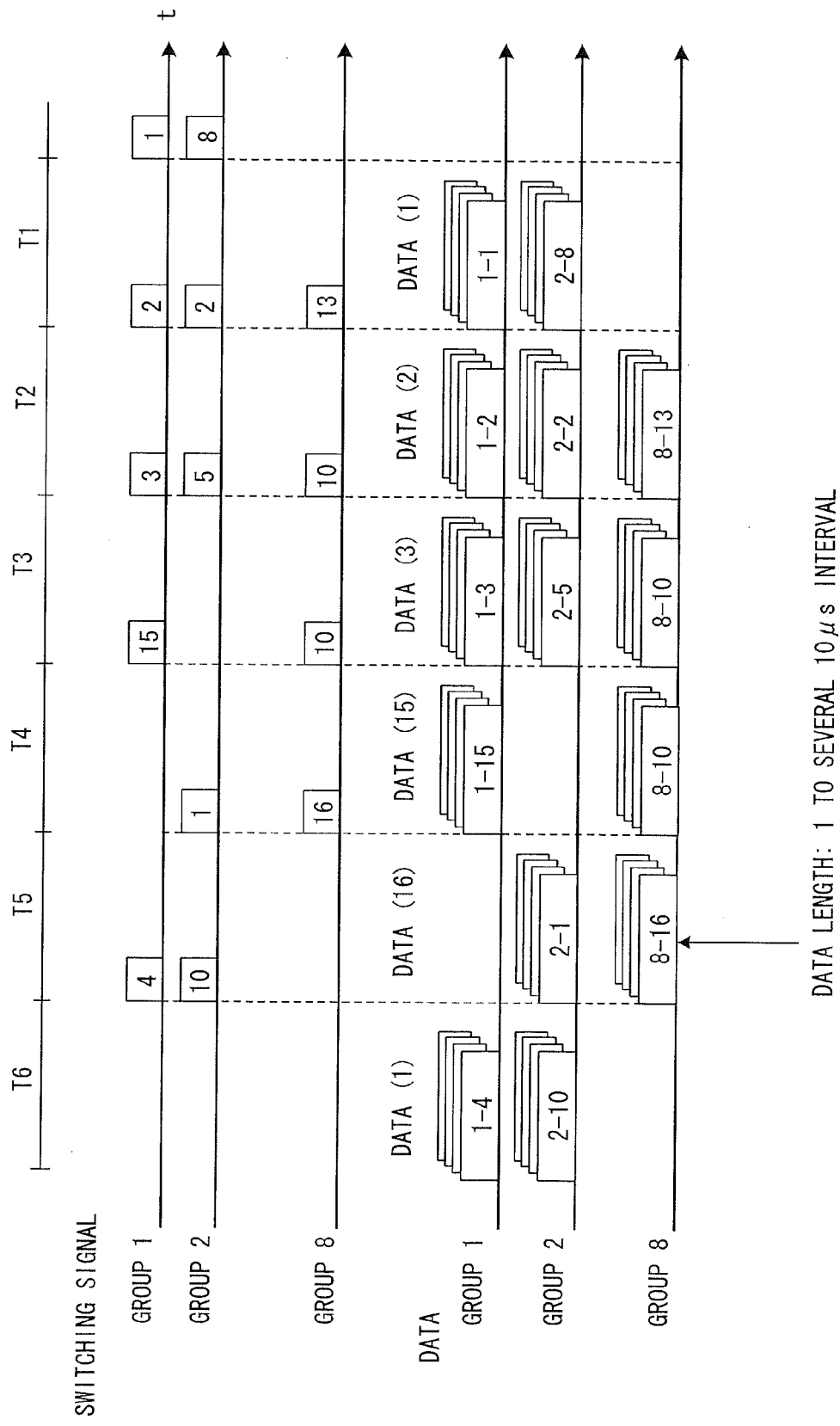
FIG. 13 is a drawing explaining the signal-switching timing for different groups.

FIG. 13 is a drawing explaining the signal switching timing for each group, and is an example in which in timeslot T1, the data for the first user 1-1 in group 1 and the data for the eighth user 2-8 in group 2 are transmitted, and in timeslot T2, data for the second user 1-2 in group 1, the data for the second user 2-2 in group 2 and the data for the thirteenth user 8-13 in group 8 are transmitted, after which transmission is performed in a similar way.

(C) Second Embodiment

Figure 14:
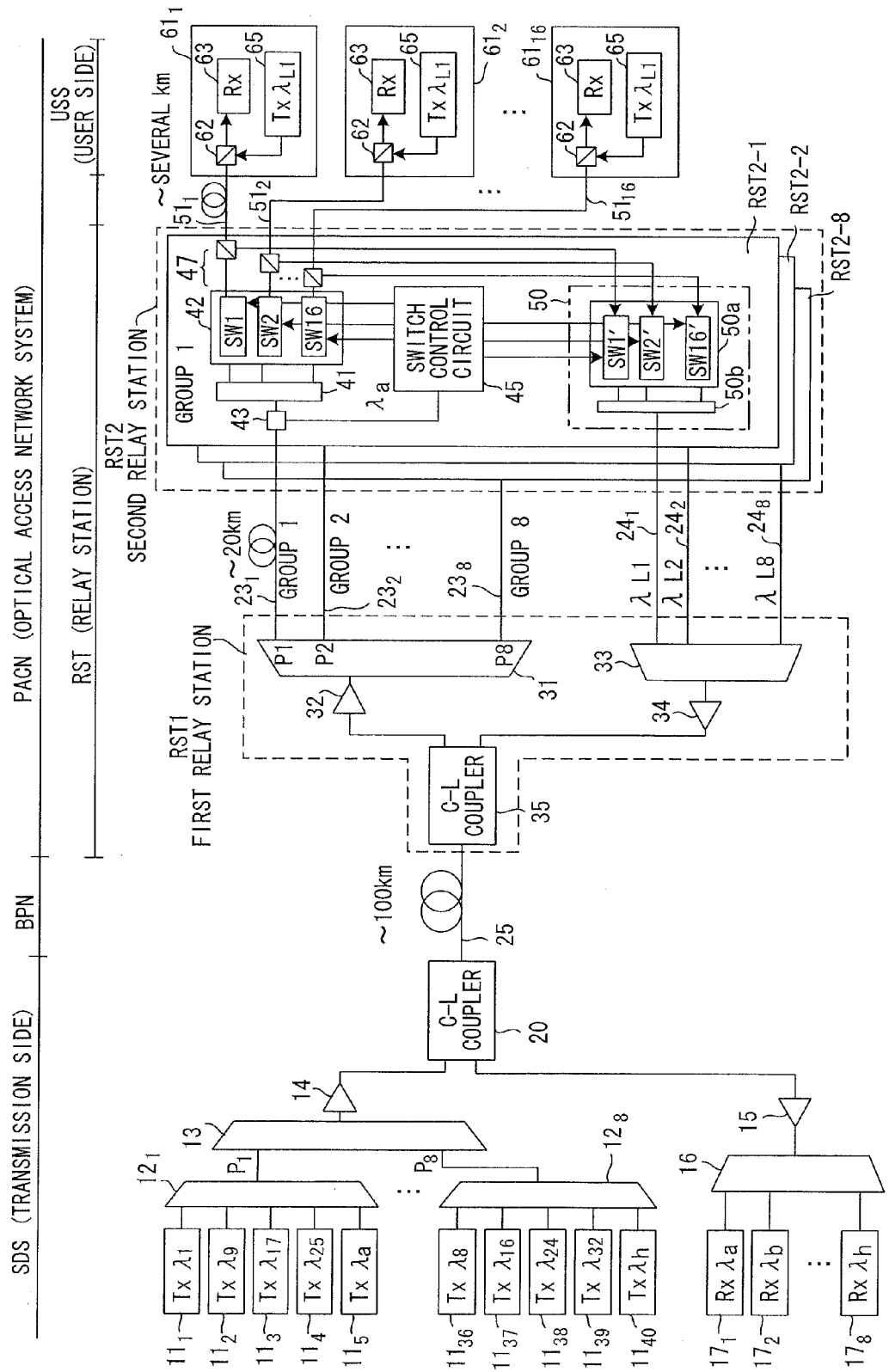
FIG. 14 is a drawing showing the overall construction of an optical communication network system that comprises a second embodiment of the optical access network system of the present invention.

FIG. 14 shows a second embodiment, where the same reference numbers are given to parts that are the same as those of the first embodiment shown in FIG. 4. The construction of this embodiment differs in that: (1) C-L couplers 20, 35 are provided on the transmission side and relay station side of a common transmission path 25; (2) the transmitter 65 of a subscriber unit performs intensity modulation of L-band signal light of a 1.5 μm band using transmission data, and transmits that signal light to the second relay station RST2-1; and (3) a serializer 50 is provided for each group in the second relay stations RST2-1 to RST2-8, and by shifting the optical signals that are input from each subscriber unit in time and combining them, outputs the signal as an optical signal having one wavelength. The C-L couplers 20, 35 are both optical wavelength multiplexing/demultiplexing filters, or optical circulators, and they select and transmit C-band optical signals in the DOWN direction, and select and transmit L-band optical signals in the UP direction.

During DOWN transmission, the C-L coupler 20 transmits a C-band 40 wave WDM optical signal that was multiplexed by a cyclic multiplexing/demultiplexing filter 13 to the transmission path 25, and the C-L coupler 35 selects the C-band 40 wave WDM optical signal that was input from that transmission path 25, and inputs the signal to a cyclic multiplexing/demultiplexing filter 31 via an optical amplifier 32. After that, by performing the same control that was performed in the first embodiment shown in FIG. 4, signal light having specified wavelengths is transmitted to the subscriber units of each group.

During UP transmission, the transmitters 65 of the subscriber units $61_1$ to $61_{16}$ of group 1 perform intensity modulation of L-band signal light of a 1.5 μm band having a specified wavelength λL1 using transmission data, and transmits that light to the second relay station RST2-1. The optical coupler 47 of the second relay station RST2-1 separates the optical signals having wavelength λL1 that were input from the subscriber units $61_1$ to $61_{16}$, and inputs the signals to the serializer 50.

The serializer 50 comprises a high-speed switch unit 50a that shifts each of the optical signals that were input from the subscriber units $61_1$ to $61_{16}$ in time and outputs the signals, and a multiplexing unit 50b that combines the optical signals that were output from the high-speed switch 50a to output a serial signal. The high-speed switch unit 50a comprises the same construction as the high-speed switch unit 42, and comprises 16 optical switches SW1' to SW16' that perform connection/disconnection between an input port and output port; On timing of the optical switches SW1' to SW16' are controlled by switch signals that are input from the switch control circuit 45. From this, the optical signals that are input from the subscriber units $61_1$ to $61_{16}$ are shifted in time and input to the multiplexing unit 50b. The multiplexing unit 50b combines the optical signals that are inputted from the optical switches SW1' to SW16' of the high-speed switch unit 50a, and transmits the result to the transmission path $24_1$ as a time-division multiplexed optical signal having a transmission speed of 10 Gbps and wavelength of λL1.

Similarly, for other groups as well, the multiplexing unit 50b transmits optical signals having a transmission speed of 10 Gbps and wavelengths of λL2 to λL8 to transmission paths $24_2$ to $24_8$.

The multiplexer 33 combines the optical signals having wavelengths λL1 to λL8 that are input from the optical transmission paths $24_1$ to $24_8$, and an optical amplifier 34 performs optical amplification of the combined WDM optical signal then inputs the result to the C-L coupler 35. The C-L coupler 35 selects the L-band 8 wave WDM signal and transmits the signal to the transmission path 25 in the DOWN direction. The C-L coupler 20 on the transmission side selects the L-band 8 wave WDM optical signal in the DOWN direction and inputs the signal to a demultiplexing filter 16 via an optical amplifier 15, and that demultiplexing filter 16 demultiplexes the optical signal into each of the wavelengths λL1 to λL8 and inputs the results to the receivers $17_1$ to $17_8$.

Figure 15:
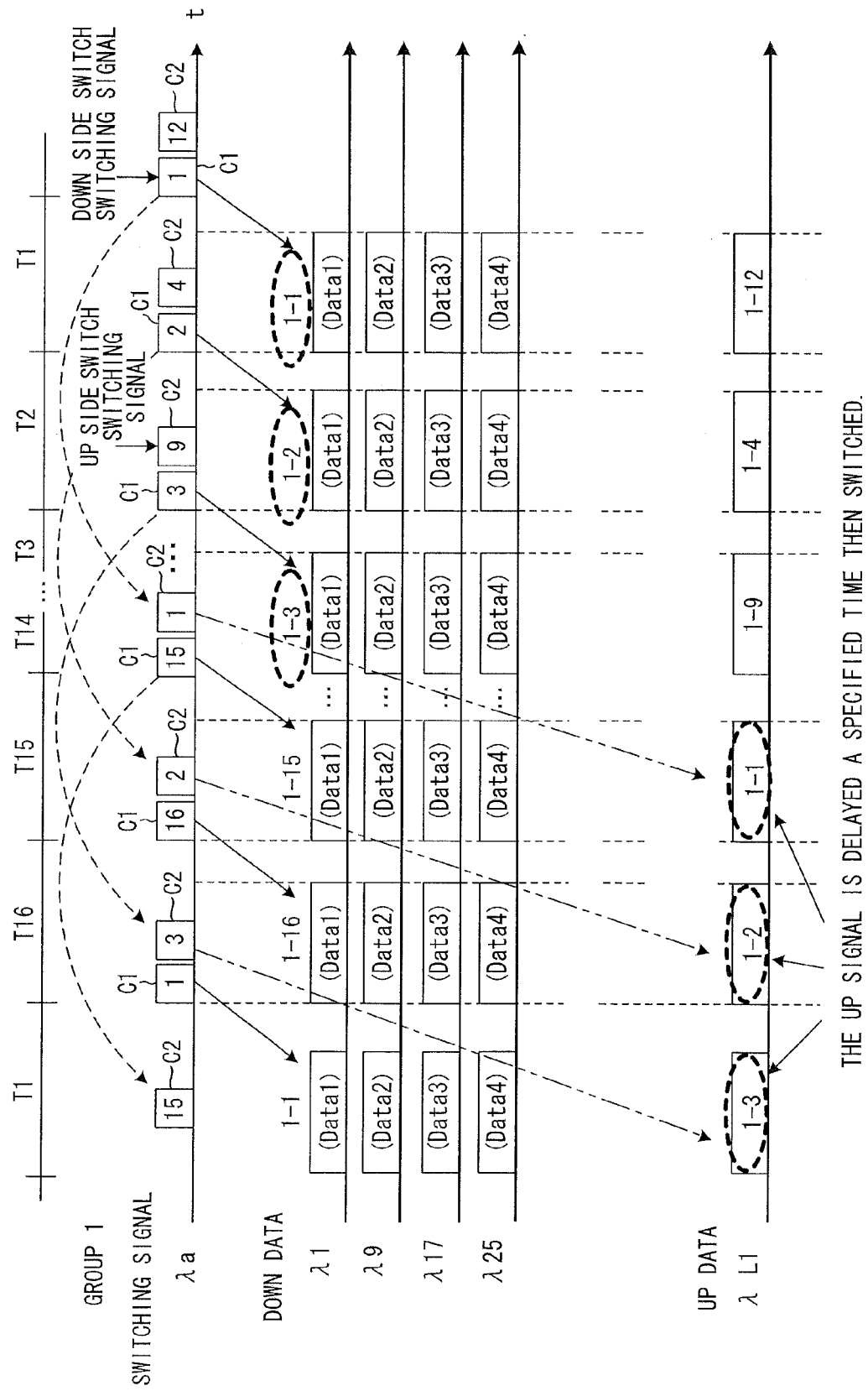
FIG. 15 is a drawing explaining the signal-switching format.
Figure 16:
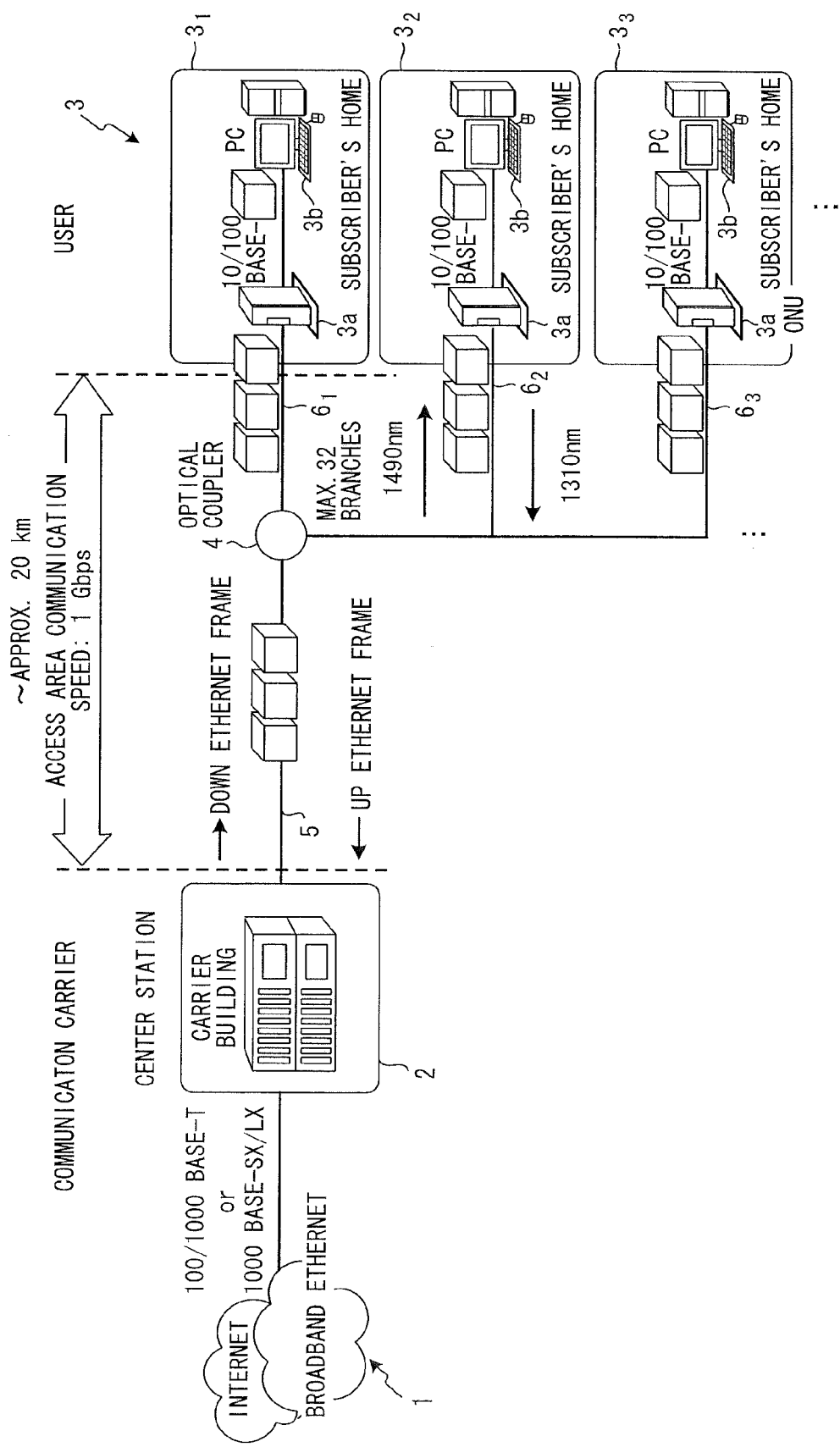
FIG. 16 is a drawing showing the construction of a conventional GE-PON.
Figure 17:
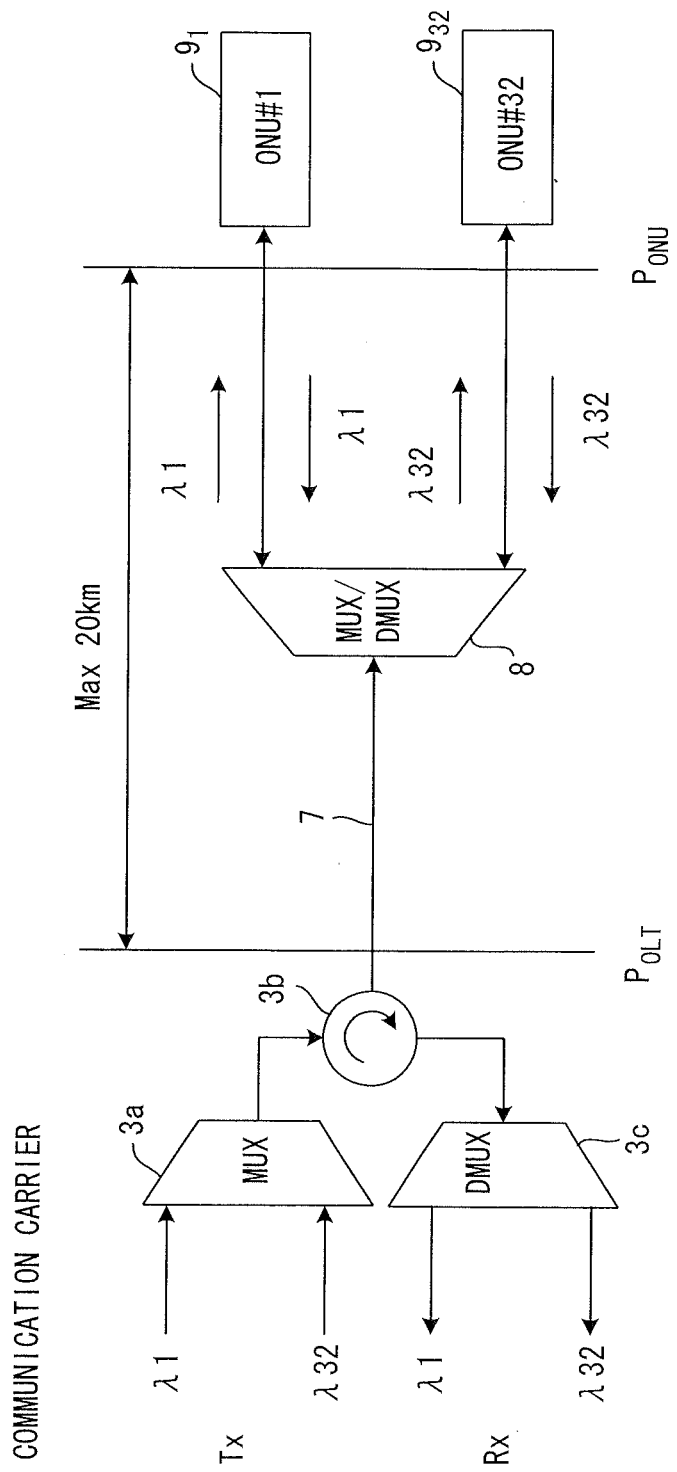
FIG. 17 is a drawing showing the construction of a convention WDM-PON

The switch control circuit 45 generates a switch signal based on control data that is included in the DOWN control optical signal. FIG. 15 is a drawing explaining the signal switching format, and is for the case of group 1 when there is 16 users per group and 4 wavelengths is used for each user.

In the case where UP transmission data is transmitted 14 timeslots after a subscriber unit receives data, the transmitting side knows the timing at which the subscriber unit receives data, so the transmitting side already knows the timeslot that a subscriber unit transmits data. Therefore, the transmitting side specifies the timing (timeslot) that a subscriber unit transmits data.

In FIG. 15, the transmission side specifies the destination user for receiving a packet by the control data C1, and specifies the source user for transmitting a packet by the control data C2. In other words, in FIG. 15, according to control data C1, the transmitting side transmits first user data at timeslot T1, transmits second user data at timeslot T2, transmits third user data at timeslot T3, ..., transmits fifteenth user data at timeslot T15, and transmits sixteenth user data at timeslot T16. Moreover, according to control data C2, data is transmitted from the first user at timeslot T15, data is transmitted from the second user at timeslot T16, and data is transmitted from the third user at timeslot T1.

Based on control data C1 that is received one timeslot before, the switch control circuit 45 sets the optical switch of the switch unit 42 to turn ON/OFF in the current timeslot, and performs ON/OFF control to transmit an optical signal to a specified user. Moreover, based on a control signal C2 that is received one timeslot before, the switch control circuit 45 sets the optical switch of the switch unit 50 to turn ON/OFF in the current timeslot, and performs ON/OFF control to output an optical signal to the multiplexer 50b.

With this second embodiment, bi-directional transmission can be performed over one fiber optic transmission path.

Effect

With the present invention a plurality of users (for example 16 users) are formed into a group and the data for the users in that group undergo wavelength multiplexing and time-division multiplexing before being transmitted, so it is possible to build an End-to-End optical access network system that is capable of keeping down the cost per bit.

Particularly, in a subscriber device, by separating a received optical signal into each wavelength, and inputting the light of each wavelength to each of the subscriber terminals, it is possible to further increase the number of users that can be handled, and suppress the cost per bit.

With the present invention, active optical elements (high-speed switching elements) are used in a relay station, and by shifting the ON/OFF timing of the switching elements, the time-division multiplexed data for each user is transmitted only to the subscriber unit of the respective users, so it is possible to build an optical access system that is capable of maintaining physical secrecy.

Moreover, with the present invention, a subscriber unit optical separates out signals having a plurality of wavelengths from an input optical signal, and uses the separated plurality of optical signals to decode a signal that was ciphered on the transmission side, then inputs that signal to a subscriber terminal, so it is possible to build an optical access system that is capable of further maintaining secrecy.

With the present invention, Semiconductor Optical Amplifiers (SOA) that are capable of being turned ON/OFF are used as switching elements, so there is no need to provide special optical amplifiers, as well as multicasting is possible, thus a low cost and compact relay station is possible.

With the present invention, the relay station is divided into two or more, with switching being performed among stations, so it is possible to build an optical access network system using tree shape or star shape network topology construction.

With the present invention, by using a cyclic multiplexing/demultiplexing filter, it is possible to reduce the number of ports of a multiplexer/demultiplexer, and to expand the number of users that can be handled in group units, thus it is possible to reduce the initial cost for employing the system.

With the present invention, it is possible to switch Wavelength Division Multiplexed (WDM) packet signals altogether, so it becomes easy to increase or decrease bandwidth according to need on the user side.

With the present invention, the switching elements are turned ON/OFF using control optical signals that are transmitted together with the data optical signals from the transmission side, so it is possible to transmit time-division multiplexed data for each user to just the respective subscriber units of the users. Moreover, with this invention, a control optical signal is used as a return optical signal, and that optical signal is modulated with the UP data, so a low-cost ONU is possible.

With the present invention, an optical transmitter that uses transmission data to modulate and output an optical signal having a different wavelength than a DOWN optical signal is provided in a subscriber unit, where optically modulated signals that are input from optical transmitters of a plurality of subscriber units in each group undergo time-division multiplexing to form an optical signal having one wavelength, and the optical signals from each group are multiplexed and transmitted to the transmission side via the same transmission path as the DOWN transmission path so bi-directional transmission is possible over one fiber optic transmission path.

What is claimed is:

1. An optical access network system comprising a relay station that receives a wavelength multiplexed optical signal (WDM optical signal) from an optical network, and transmits optical signals having specified wavelengths to subscriber units, wherein said relay station comprises:

optical demultiplexing means for demultiplexing said WDM optical signal into a plurality of optical signals having fixed wavelength intervals between them as one group;

optical branching means for dividing the demultiplexed group of optical signals into a plurality of branches; and switching means for transmitting the divided group of optical signals to specified subscriber units, wherein said optical demultiplexing means is a cyclic multiplexing/demultiplexing filter that demultiplexes each of the optical signals of a plurality of groups from said WDM optical signal, and multiplexes the optical signals of each group, then outputs the signal from a specified port; and said relay station comprises a said optical branching means and optical switching means for each group.

2. The optical access network system of claim 1 wherein said optical switching means comprises a plurality of optical semiconductor amplifiers having a switching function for turning ON/OFF a connection between input ports and output ports.

3. The optical access network system of claim 2, wherein said group of optical signals is created by multiplexing optical signals transmitted to subscriber units that have been shifted in time, and wherein by shifting the times when the said plurality of optical semiconductor amplifiers are turned ON/OFF, specified optical signals are input to specified subscriber units.

4. The optical access network system of claim 2 wherein by driving said plurality of optical semiconductor amplifiers of said group optical switching means so they go ON at the same time, the same plurality of optical signals that have been branched off are transmitted to a plurality of subscriber units at the same time.

5. The optical network access network system of claim 1 wherein said wavelength interval between optical signals of a group is an interval for which 4-wave optical mixing does not occur.

6. The optical access network system of claim 1 wherein said wavelength multiplexed group of optical signals comprise optical signals that transmit subscriber data, and a control optical signal having a different wavelength from the wavelengths of the data optical signals, and for each group, said relay station comprises: demultiplexing means for demultiplexing said control optical signal; and a control circuit for performing switching of high-speed switching elements of said optical switching means using the demultiplexed control optical signal.

7. The optical access network system of claim 6 wherein said control circuit performs switching by separating said group of optical signals into 100 μs or less optical burst signals.

8. The optical access network system of claim 6 wherein said control optical signal is modulated, and said relay station comprises:
an optical modulation unit for each group that performs intensity modulation of the control optical signal using data that is transmitted from a said subscriber unit and outputs the result; and multiplexing means for multiplexing the optical signals that are output from the optical modulation unit of each group and transmits the result to the transmission side via a transmission path that differs from a DOWN transmission path.

9. The optical access network system of claim 8 wherein said relay station comprises a transmission data multiplexing unit that demodulates the transmission data input by optical signals from a plurality of subscriber units, and multiplexes that plurality of transmission data, and said optical modulation unit performs the intensity modulation of said control optical signal using the multiplexed transmission data.

10. The optical access network system of claim 8 wherein said relay station comprises an optical amplifier that amplifies in the saturation region said control optical signal that was demultiplexed by said demultiplexing means and inputs the result to said optical modulation means.

11. The optical access network system of claim 1 wherein a first portion of the relay station that comprises said cyclic multiplexing/demultiplexing filter, a second portion of the relay station that comprises said optical branching means and optical switching means, and the subscriber units are physically connected in a tree shape.

12. The optical access network system of claim 1 wherein said subscriber unit has a wavelength selection filter that separates optical signals of each wavelength from the input optical signals and inputs each of the optical signals to respective subscriber terminals.

13. The optical access network system of claim 1 wherein said subscriber unit has a wavelength selection filter that separates out optical signals of each wavelength from the input wavelength multiplexed optical signal, and a decoding circuit that decodes signals that were encoded on the transmission side using the optical signals that were separated out, and inputs the result to subscriber terminals.

14. The optical access network system of claim 6 wherein each subscriber unit comprises an optical transmitter that modulates an optical signal having a wavelength that is different from the wavelength of a DOWN optical signal with transmission data and outputs the result, and said relay station comprises: a combination means for shifting in time and combining the optical signals that were input from said transmitters of each of the subscriber units to output an optical signal having one wavelength; a multiplexing unit that multiplexes said optical signals that were input from said combination means of a plurality of groups, and an optical coupler that transmits an optical signal that was output from the multiplexing unit to the transmission side by the same transmission path as the DOWN transmission path; and by separating the optical signals that were transmitted from the subscriber side along said transmission path on the transmission side, bi-directional transmission is performed using one fiber optic transmission path.

15. The optical access network system of claim 14 wherein said optical coupler is an optical wavelength band multiplexing/demultiplexing filter, or optical circulator.

16. The optical access network system of claim 14 wherein said combination means comprises: switching means for shifting in time and switching optical signals that are input from each subscriber unit; and a multiplexing unit that multiplexes the optical signals that are output from the switching means and outputs the result as an optical signal having one wavelength; wherein said control optical signal includes a control signal that controls the switching by the switching means.

* * * * *

UNITED STATES PATENT AND TRADEMARK OFFICE
CERTIFICATE OF CORRECTION

PATENT NO.         : 8,538,259 B2
APPLICATION NO.    : 13/524223
DATED              : September 17, 2013
INVENTOR(S)        : Yutaka Kai It is certified that error appears in the above-identified patent and that said Letters Patent is hereby corrected as shown below:

In the Claims:

In Column 19, line 1, in Claim 5, after "optical" delete "network".

Signed and Sealed this
Seventh Day of January, 2014

Margaret A. Focarino
*Commissioner for Patents of the United States Patent and Trademark Office*